United States Patent [19]

Sparks

[11] Patent Number: 5,204,860
[45] Date of Patent: Apr. 20, 1993

[54] NETWORK TERMINATING TERMINAL APPARATUS FOR INTEGRATED SERVICES DIGITAL NETWORK

[75] Inventor: Thomas C. Sparks, Nepean, Canada

[73] Assignee: Northern Telecom Limited, Montreal, Canada

[21] Appl. No.: 622,631

[22] Filed: Dec. 5, 1990

[51] Int. Cl.$^5$ .............................................. H04J 3/12
[52] U.S. Cl. ................................. 370/110.1; 370/58.1
[58] Field of Search ...................... 370/110.1, 76, 85.1, 370/58.1, 94.1, 60

[56] References Cited

U.S. PATENT DOCUMENTS

| | | | |
|---|---|---|---|
| 4,592,045 | 5/1986 | Fundneider | 370/58 |
| 4,592,047 | 5/1986 | Fundneider | 370/58 |
| 4,835,769 | 5/1989 | Donaghue, Jr. et al. | 370/85.1 |
| 4,905,237 | 2/1990 | Voelzke | 370/110.1 |
| 4,965,795 | 10/1990 | Coffelt et al. | 370/110.1 |
| 4,965,811 | 10/1990 | Sparks | 370/103 |
| 4,985,891 | 1/1991 | Fujiwara et al. | 370/110.1 |

*Primary Examiner*—Douglas W. Olms
*Assistant Examiner*—Shick Hom
*Attorney, Agent, or Firm*—Thomas Adams

[57] ABSTRACT

Network terminating terminal apparatus, for use in an Integrated Services Digital Network, comprises a U-interface and a S/T interface. The U-interface allows the integrated terminal apparatus to communicate with a central office directly, without a separate network terminator. Remote terminals may be connected to the network terminating terminal apparatus, via its S/T interface. The network terminating terminal apparatus then serves as a conventional network terminator. The network terminating terminal apparatus includes circuitry for controlling D-channel access by the integrated terminal apparatus. The circuitry detects the framing of the signal received at the U-interface and the D-channel information from the remote terminals and ensures that the D-channel data from the integrated terminal apparatus is supplied to the S/T interface at the appropriate time for insertion into the D-echo channel of the signal returned to the remote terminals. In addition, the D-channel data from the integrated terminal apparatus is supplied to the U interface, with the D-channel from remote terminals, for transmission in D-channel of the signal to the central office.

12 Claims, 17 Drawing Sheets

NETWORK TERMINATING TERMINAL APPARATUS FOR INTEGRATED SERVICES DIGITAL NETWORK

BACKGROUND OF THE INVENTION

The invention relates to terminal apparatus for a digital telecommunications system, and is especially applicable to systems capable of communicating voice and data signals over the same channel, for example Integrated Services Digital Networks.(ISDN)

In ISDN, voice and data signals are transmitted using a channel having a bit rate of, for example, 64 kBit/second. This channel extends between central office equipment and the subscriber's premises as a two-wire line. In North America basic access comprises two 64 kBit/second "B" channels for data and one 16 kBit/second "D" channel for signalling data. This access is usually referred to as "2B+D". At the subscriber's premises, the two-wire line terminates in what is known as the "U-interface" in the subscriber's network termination apparatus (NT). The network termination apparatus supports multiple terminal apparatus (TE), each connected to the network termination apparatus by what is known as an "S" or "T" or "S/T" interface. The terminal apparatus may be connected in bus or star configuration. In North America, ANSI T1.601 governs the U interface and ANSI T1.605 governs the S/T interface.

It has been recognized that it would be desirable to reduce the expensive stocks of network terminators and terminal apparatus. U.S. Pat. No. 4,905,237 by Voelzke discloses an ISDN terminal apparatus which can be configured to connect either a T-interface or a U-interface i.e. four wire and two wire respectively. The terminal can detect automatically whether it is connected to a two wire interface or a four wire interface. When connected to a T interface, Voelzke's terminal provides for other terminals of the same type to be connected by way of an additional plug connector. Conversely, when configured for a U-interface, it makes the T-interface available at an additional plug connector to allow connection of other terminal apparatus. Accordingly, the local terminal apparatus serves as a network terminator for the U interface and also provides an interface for additional terminals.

Voelzke focuses his discussion upon power supply and automatic detection issues. He does not discuss in detail how data is handled, specifically D-channel signalling.

In a typical ISDN system, the network terminator transmits the same 2B+D signals to all terminal apparatus. Each active terminal apparatus may be assigned an individual B channel in that signal. When transmitting, the network terminator incorporates a frame marker which is derived from the normal 8 KHz frame sync of the signal it receives at the U-interface. Likewise, the terminal apparatus will include its own frame marker in the signal it returns to the network terminator.

The minimum and maximum time delays between the transmission of the frame marker and the receipt of the incoming terminal frame markers will be fixed and hence can be offset. The distance between the network terminator and the terminal apparatus closest to it will determine the earliest time that a corresponding frame marker is received by the network terminator, i.e. the minimum time delay plus the "round trip" delay. If the network terminator were integrated with a terminal apparatus in the same enclosure, with the integrated terminal apparatus connected to the S/T interface in the usual way, the integrated terminal apparatus would be the closest terminal apparatus in the system since it would be effectively at a distance of zero feet. This would limit the system to short passive bus configurations. The longer loop lengths allowed with other configurations would not be available.

OBJECT OF THE INVENTION

An object of the present invention is to provide a terminal apparatus, for use in an Integrated Services Digital Network, which comprises a network termination interface and a terminal interface for other terminals connected thereto by various bus configurations.

SUMMARY OF THE INVENTION

According to the present invention, network terminating terminal apparatus, for an integrated services digital network, comprises:

a U-interface (412) for connection to the network and a U-transceiver (411) for extracting from signals received via said U-interface (412) B-channel data and D-channel data, a clock signal and framing signal;

an S/T interface for connecting to remote terminal apparatus and a S/T transceiver (414) for transmitting signals to, and receiving signals from, said remote terminal apparatus via said S/T interface (426);

a user interface and LAPD circuit (418) for interfacing local station apparatus (419, 422), including D-channel protocol means responsive to said user interface for generating a D-channel access signal ($D_{request}$, $D_{class}$) for securing access to said D-channel to enable said user interface to transmit data to said U-transceiver (411);

D-channel monitoring and contention resolution means (427) for monitoring a D-channel in a data signal from said protocol means and signals received from said remote terminals by said S/T transceiver (414) and resolving contention between said user interface (418) and said remote terminal apparatus and for providing to said user interface (418) a signal enabling access and a D-channel control signal ($D_b$);

D-channel access means responsive to said framing signal, said clock signal, said access enabling signal and said D-channel control signal ($D_b$) for controlling application to said U-transceiver 411 of B-channel data and D-channel data in said data signal ($TX_{LAPD}$) from said user interface and LAPD (418) selectively;

said D-channel access means (423) serving to supply a D-channel control signal ($D_b$) to said S/T transceiver, said S/T transceiver being arranged to transmit said signal as an ECHO signal to said remote terminals.

BRIEF DESCRIPTION OF THE DRAWINGS

An embodiment of the invention will now be described, by way of example only, with reference to the accompanying drawings, in which.

DESCRIPTION OF A PREFERRED EMBODIMENT

Figure 1:
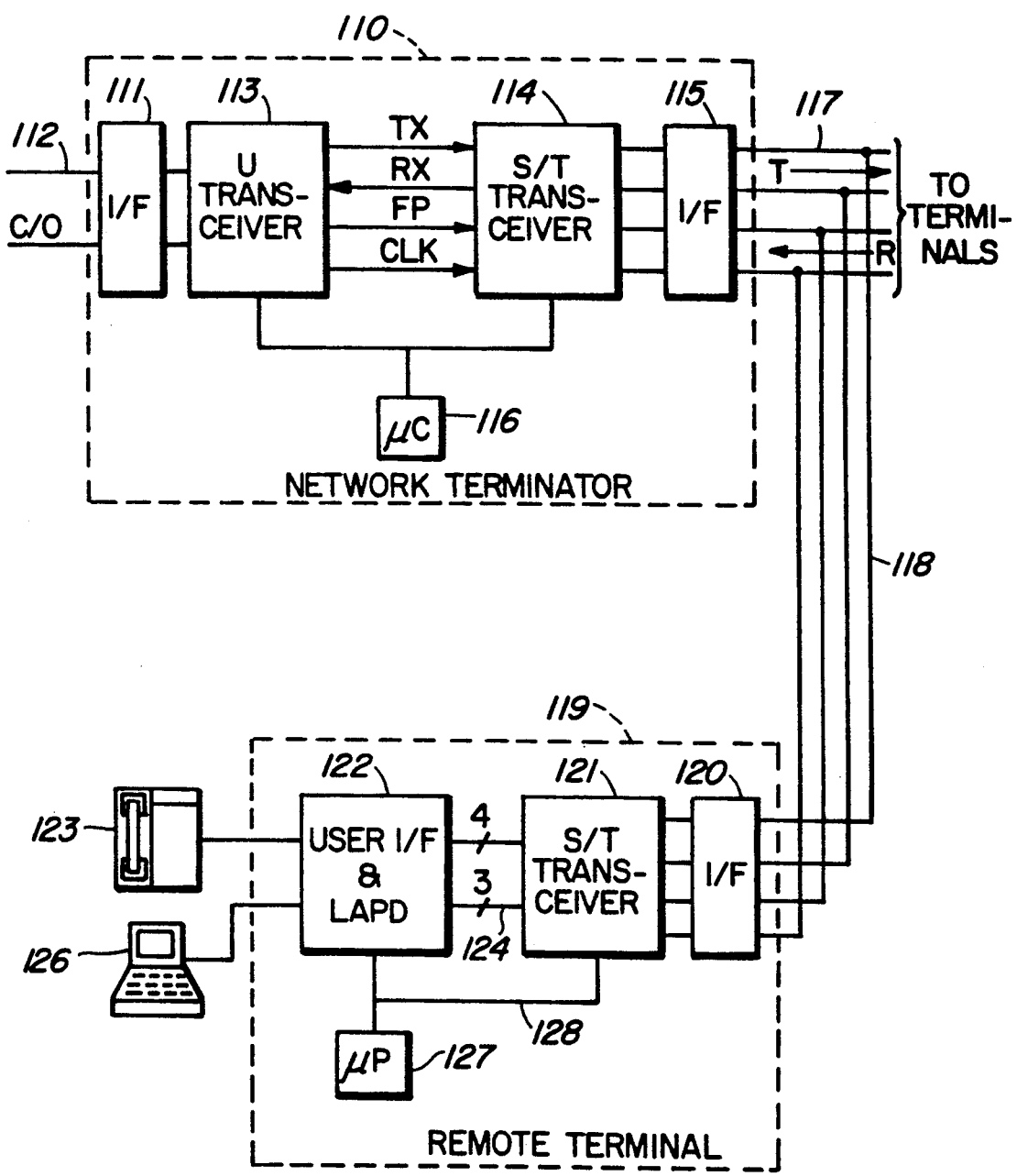
FIG. 1 is a block schematic diagram of a prior art network terminator and a remote terminal apparatus interconnected by a subscriber loop.

Referring to FIG. 1, a network terminator 110 comprises a U-interface 111 connected to central office equipment (not shown) by a line 112. In North America, the signals passing across the U-interface would be in 2B1Q format which is a four-level signal defined in ANSI T1.601. Other formats might be employed for other countries. The U-interface 111 is connected to the input of a U-transceiver 113, specifically an integrated circuit part number MC145472 by Motorola Inc. The U-transceiver 113 converts the 2B1Q signal into binary data output signals comprising two "B" channels and a "D" channel, a framing signal FP and a clock signal CLK. These outputs of the U-transceiver 113 are supplied to an S/T transceiver circuit 114, specifically an integrated circuit part number MC145475 by Motorola Inc. The S/T transceiver 114 supplies corresponding digital signals to an S/T interface 115. S/T transceiver 114 receives digital data signals via interface 115 from remote terminal apparatus and passes them as a 2B+D signal (RX) to the U-transceiver 113. The U-transceiver 113 and the S/T transceiver 114 are controlled by a microcontroller 116.

The S/T interface 114 is connected to the remote terminal apparatus by subscriber loops 117 and loop taps. One such remote terminal apparatus is shown connected to interface 115 by a loop tap 118. Although the remote terminal apparatus are shown connected to the S/T interface 115 in a bus configuration, it should be appreciated that other configurations are possible.

Terminal apparatus 119 is shown in FIG. 1 to comprise an S/T interface 120 connected to an S/T transceiver circuit 121, conveniently also an integrated circuit part number MC145475 by Motorola Inc. but configured for use in a terminal apparatus.

S/T transceiver 121 is connected to a user interface and LAPD circuit 122, which includes a code, other circuitry connected to user station apparatus 123 for handling voice and data communications, and a link access protocol on the D-channel device (LAPD). The connection between the S/T transceiver 121 and the user interface and LAPD device 122 comprises four lines which correspond to those in the network terminator 110, to carry a 8 KHz framing signal (FP), a bit rate clock (CLK), a 2B+D transmit signal (TX) and a 2B+D receive signal (RX). The user interface and LAPD circuit 122 comprises an interface for a subscriber terminal 126, and a Motorola integrated circuit part number MC145554 which translates a B channel and converts it into a voice signal. The user interface and LAPD circuit 122 is controlled by the microprocessor 127 which handles the D-channel signalling and supervisory information.

The same user interface and LAPD circuit 122, with microprocessor 127, translates signals received from the subscriber handset 123 into data signals and applies them to S/T transceiver 121. In addition, the S/T transceiver 121 supplies D-channel control signals on bus 124 to the LAPD port of user interface and LAPD circuit 122 which comprises an integrated circuit part number MC145488 by Motorola Inc.

Each of the remote terminals shown in FIG. 1 will have a timing recovery circuit to control sampling of the digital signal T it receives and to provide for proper timing of the signal R which it transmits back to the network terminator 110.

Figure 2:
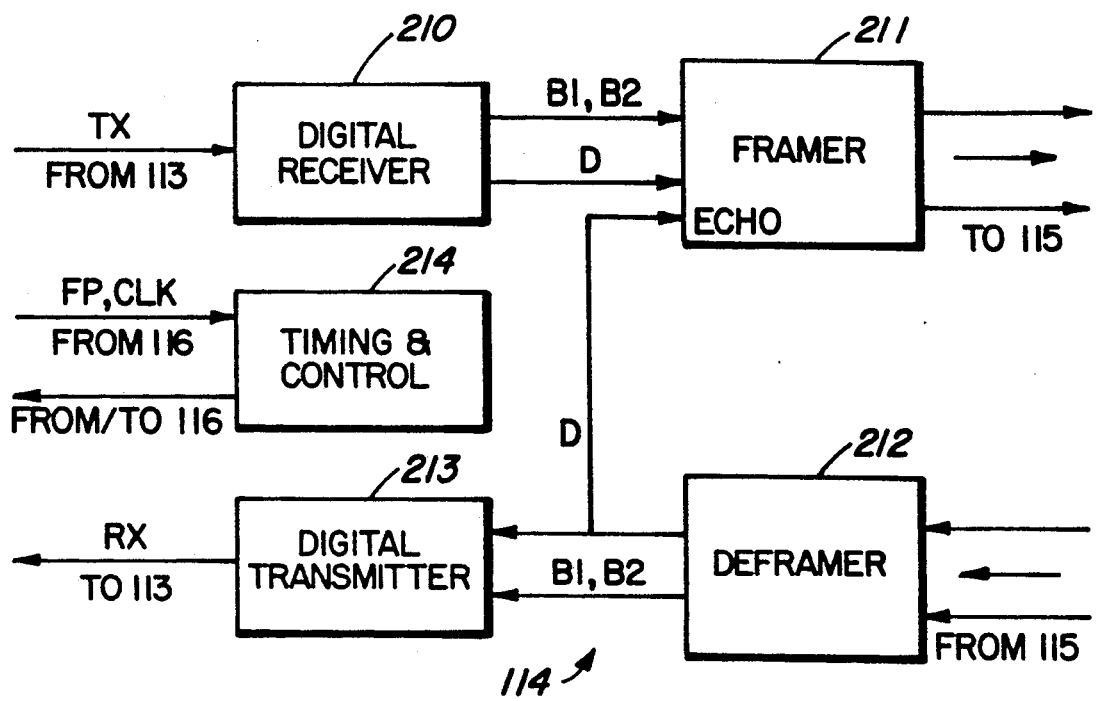
FIG. 2 illustrates operation of an S/T transceiver of the network terminator of FIG. 1.

It should be noted that the MC145475 integrated circuit may be used in either a network terminator or in a terminal apparatus, different portions being used depending upon the situation. FIG. 2 illustrates the functioning of S/T transceiver 114, which comprises integrated circuit MC145475 in network termination mode. The 2B+D signal TX, from U-transceiver 113, is applied to a digital receiver 210 which extracts the D-channel supervisory and signalling information and applies it, with the separated data signals B1 and B2, to framer 211. The framer 211 multiplexes the signals together with frame marker and overhead bits and applies them as transmitted signal T to interface 115. Incoming signals R received from all of the remote terminal apparatus via interface 115, are deframed by deframer 212, which applies separate data signals B1, B2 and signalling D-channel, to digital transmitter 213. The digital transmitter 213 multiplexes and retimes the B1, B2 and D signals to form 2B+D signal RX for transmission to U-transceiver 113. The deframer 212 also supplies the same D-channel signal to the ECHO input of framer 211 which incorporates it into the transmit signal T at an appropriate time to be sent back via interface 115 to the terminal apparatus as the echo signal. The digital receiver 210, framer 211, deframer 212, and digital transmitter 213 are controlled by microcontroller 116 (FIG. 1), the control function being represented in FIG. 2 by timing and control means 214.

Figure 3A:
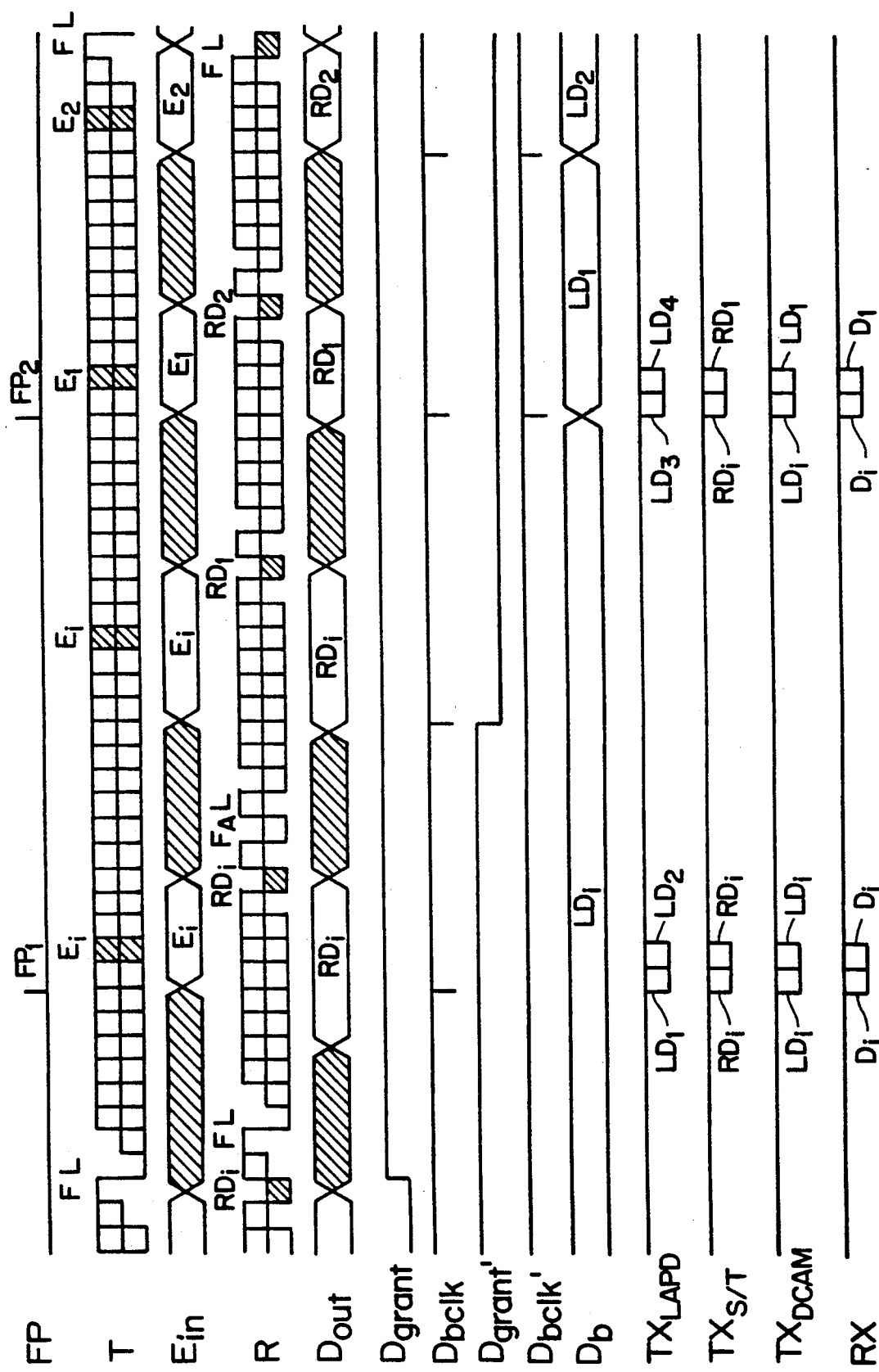
FIGS. 3A and 3B represent signals exchanged between, and within, the components of FIG. 4.
Figure 3B:
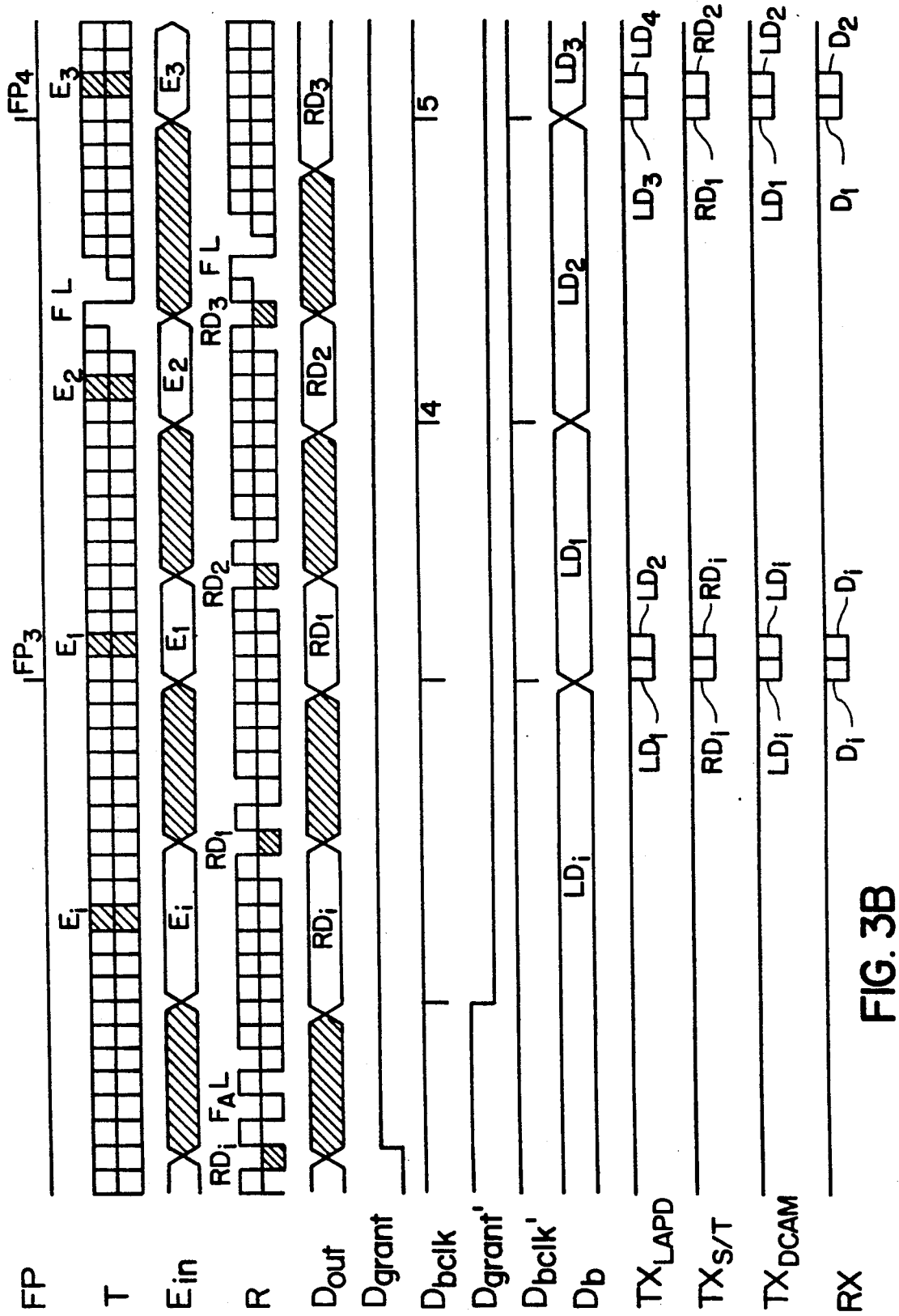

The signals T and R exchanged between the network terminator 110 and the remote terminal 119 are in accordance with ANSI standard T1.605 and are illustrated as T and R in FIGS. 3A and 3B. The network terminator 110 broadcasts transmit signal T to all of the remote terminal apparatus 119 and receives from the remote terminal apparatus the signal R.

The transmit signal T includes a frame marker F/L, which is the transition between the F bit and the adjacent L bit and is determined according to the normal 8 KHz framing signal FP derived from the U interface signal translated by U-transceiver 113. Each remote terminal apparatus returns a similar frame marker F/L in the signal it transmits to the network terminator 110. The remote terminal apparatus transmit to the network terminator 110 on an assigned basis.

The terminal apparatus all transmit the framing information {frame marker F/L of FIGS. 3A and 3B} back to the network terminator 110 on a continuous basis but each will only transmit data (either one B channel B1, the other B channel B2, or both B channels B1 and B2) depending upon its assignment. All terminal apparatus transmit D-channel information until contention has been resolved whereupon only one will continue transmitting information while the others transmit "idle".

In order to transmit D-channel signalling to the network terminator 110, a terminal apparatus must gain access to the D-channel, which is a common channel to all of the remote terminal apparatus. It does so by first inserting bits into the D-channel of the "received" signal R sent to the network terminator 110. The deframer 212 in the network terminator 110 passes the D-channel bits as the echo channel to framer 211 which inserts them into the corresponding outgoing transmit signal T as D-echo bits 'E' (FIGS. 3A and 3B) which are reflected back to all of the terminal apparatus. The terminal apparatus monitor this D-echo channel continuously. If a preset number of returned D-echo bits match the D-channel idle bits transmitted by that terminal apparatus, it has the effect of securing access. When the terminal has access, it still monitors the returned D-echo bits to confirm that the network terminator received the same bits the terminal apparatus sent. If a mismatch occurs, the terminal apparatus withdraws and sends "idle" code again; otherwise the terminal apparatus continues transmitting its D-channel bits and monitoring the returned D-echo bits.

It is desirable to integrate a terminal apparatus with the network terminator while permitting multiple remote terminals to be connected to the network terminator. As mentioned previously, if the terminal apparatus were connected to the network terminator in the conventional way, only short passive bus configurations could be used, whereas other bus configurations might be preferred since they support longer loops.

Embodiments of the present invention arrange for the integrated terminal apparatus to access the D-channel and compete with the remote terminals for access while allowing any of the usual bus configurations to be used for remote terminals.

Figure 4:
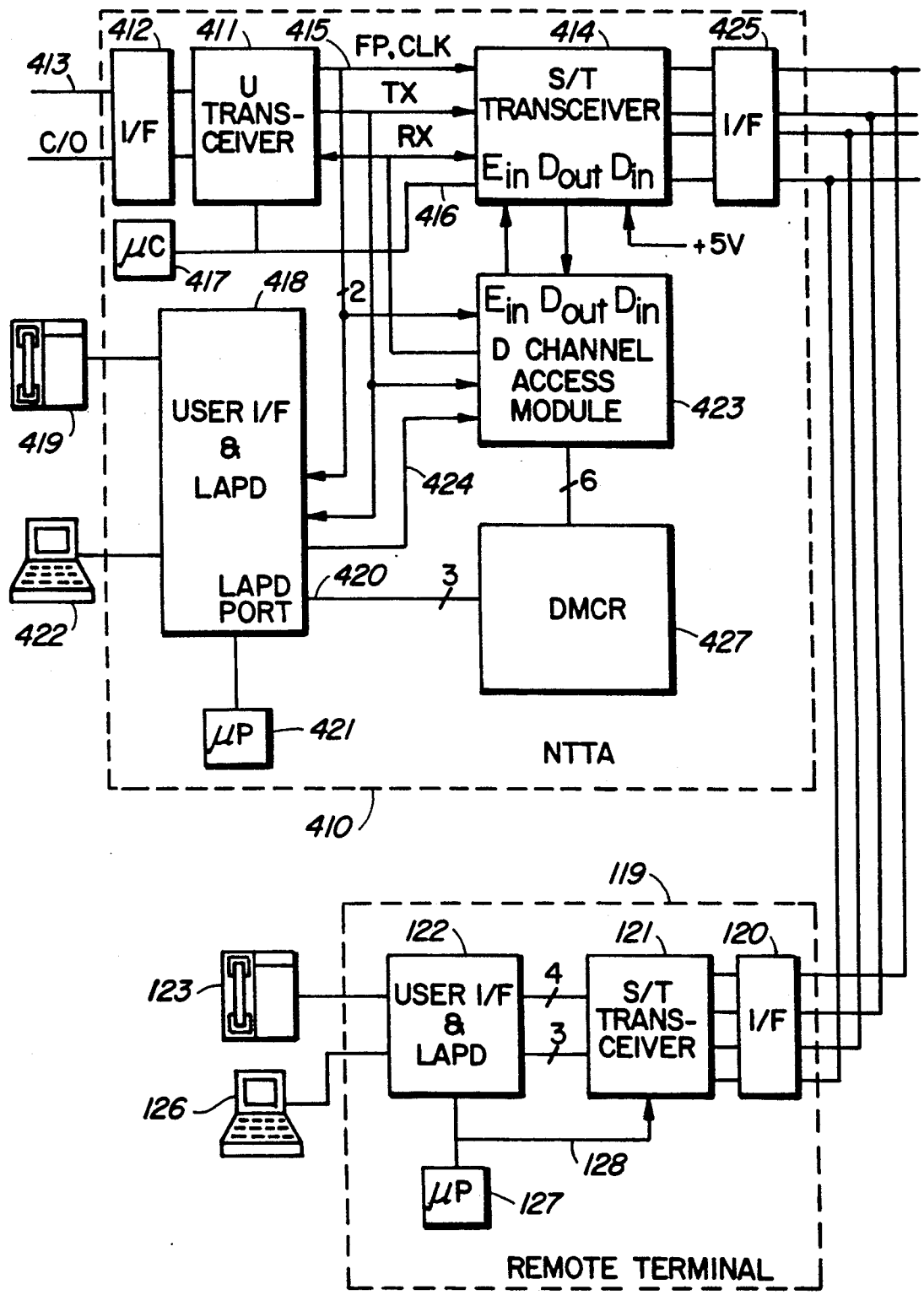
FIG. 4 is a block schematic diagram of an embodiment of the invention comprising a network terminating terminal apparatus connected to a remote terminal apparatus.

FIG. 4 illustrates an embodiment of the invention comprising a network terminating terminal apparatus 410 connected to a remote terminal apparatus 119 in the usual way. The remote terminal apparatus 119 may be identical to that shown in FIG. 1 and hence has the same reference numbers.

The network terminating terminal apparatus 410 comprises a U-transceiver 411 connected to a U interface 412 which will be connected to a central office by line 413. The U-transceiver 411 is connected to a S/T transceiver 414 by a data bus for signals TX and RX and a control bus for signals FP and CLK. A microprocessor 417 controls the U-transceiver 411 and S/T transceiver 414. These components correspond to those in the known network terminator described with respect to FIG. 1. The integrated local terminal apparatus includes a user interface and LAPD circuit 418 which corresponds to circuit 122 in remote terminal 119 and is connected to the control bus 415, data bus TX and to microprocessor 421. The user interface and LAPD circuit 418 is controlled by microprocessor 421 and provides an interface to user station apparatus 419 and to a subscriber workstation 422. The LAPD device of the user interface and LAPD circuit 418 is connected by line 424 to a D-channel access module (DCAM) 423, which is connected to the S/T transceiver 414. The LAPD user interface and circuit 418 and DCAM 423 share signals FP and CLK by way of the control bus 415. User interface and LAPD circuit 418 receives 2B+D signals from the data bus TX and supplies a signal $TX_{LAPD}$(424) to DCAM 423. It should be noted that $TX_{LAPD}$ includes the B-channels from the user interface. In addition, the user interface and LAPD circuit 418 exchanges D-channel signals ($D_{request}$, $D_{class}$, $D_{grant}$) by way of LAPD port 420 with DMCR 427.

The remote terminal apparatus are coupled to the S/T transceiver 414 by way of S/T interface 425. This can be considered to be a star network termination configuration in that there are two interfaces from the S/T transceiver 414, one for the local or integrated terminal apparatus and the other for the remote terminal apparatus.

Figure 5:
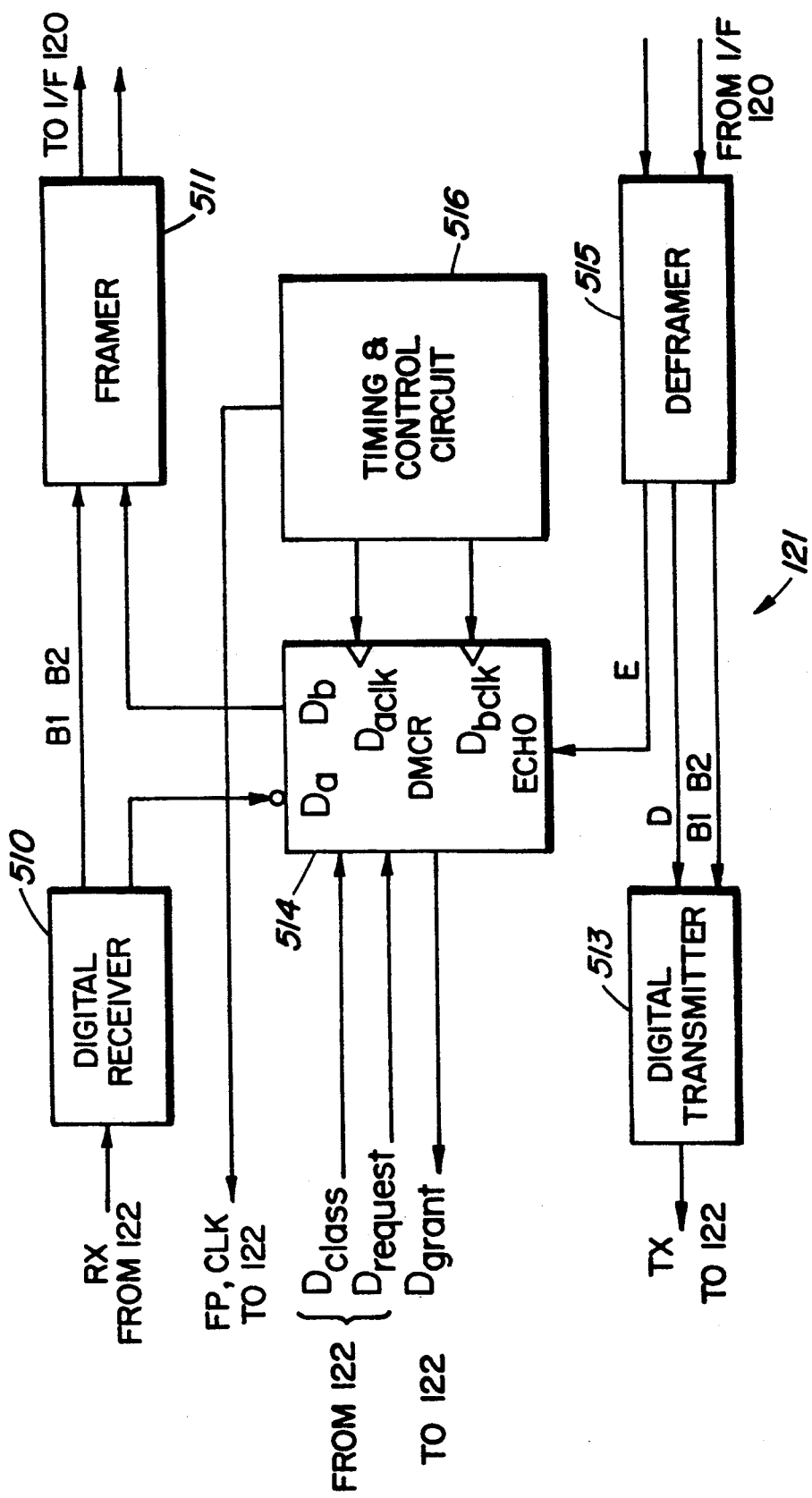
FIG. 5 is a functional block diagram illustrating the remote terminal apparatus of FIG. 4.

FIG. 5 illustrates the functioning of S/T transceiver 121 in remote terminal apparatus 119 of FIGS. 1 and 4. Digital receiver 510 passes the digital data signals B1 and B2 from user interface and LAPD 122 to framer 511, which multiplexes them with frame marker, overhead bits and signal $D_b$ and passes them to interface 120. In addition, digital receiver 510 passes the D-channel monitoring signal $D_a$ to a D-channel monitoring and contention resolution circuit (DMCR) 514. DMCR 514 produces a delayed D-channel signal $D_b$ and supplies it to framer 511 which multiplexes it with other signals and returns it to the network terminator 110 via the loop tap 118 and interface 115 when the remote terminal apparatus 119 has secured access to the D-channel. Otherwise, the DMCR 427 forces $D_b$ to be "idle." The user interface and LAPD circuit 122 (FIGS. 1 and 4) supplies two signals, $D_{class}$ and $D_{request}$ to DMCR circuit 514. In response, DMCR 514 produces a $D_{grant}$ signal and supplies it to user interface and LAPD circuit 122. The purpose of, and relationship between these signals will be described in more detail later with reference to FIGS. 9A, 9B and 9C.

Deframer 515 extracts the D-echo signal (E) from the transmit signal T and supplies it to the ECHO input of DMCR 514. Timing and control circuit 516 supplies to DMCR 514 clock signals $D_{aclk}$ and $D_{bclk}$ derived from the received signals. The clock signals $D_{aclk}$ and $D_{bclk}$ from timing and control circuit 516 correspond to D-channel signals $D_a$ and $D_b$, respectively.

While in D-channel monitoring mode, the DMCR 514 forces the $D_b$ signal to be idle (binary 1s). Once monitoring is complete and successful, $D_{grant}$ is activated. When $D_{request}$ is also activated, the $D_b$ signal will map directly the $D_a$ signal, which is delayed appropriately in the DMCR 514, since the $D_a$ signal arrives in two bit clusters before the $D_b$ is allowed to be inserted into signal R. At this point, the DMCR 514 will begin contention resolution, monitoring the received signal T to determine whether or not the D-echo bit (E) received is the same as the last $D_b$ bit sent out. When it is, the DMCR 514 will continue sending $D_b$ equal to $D_a$ plus the delay introduced by the DMCR 514. If it is not the same, the DMCR will force $D_b$ to the idle condition and return to the monitoring phase.

Figure 6:
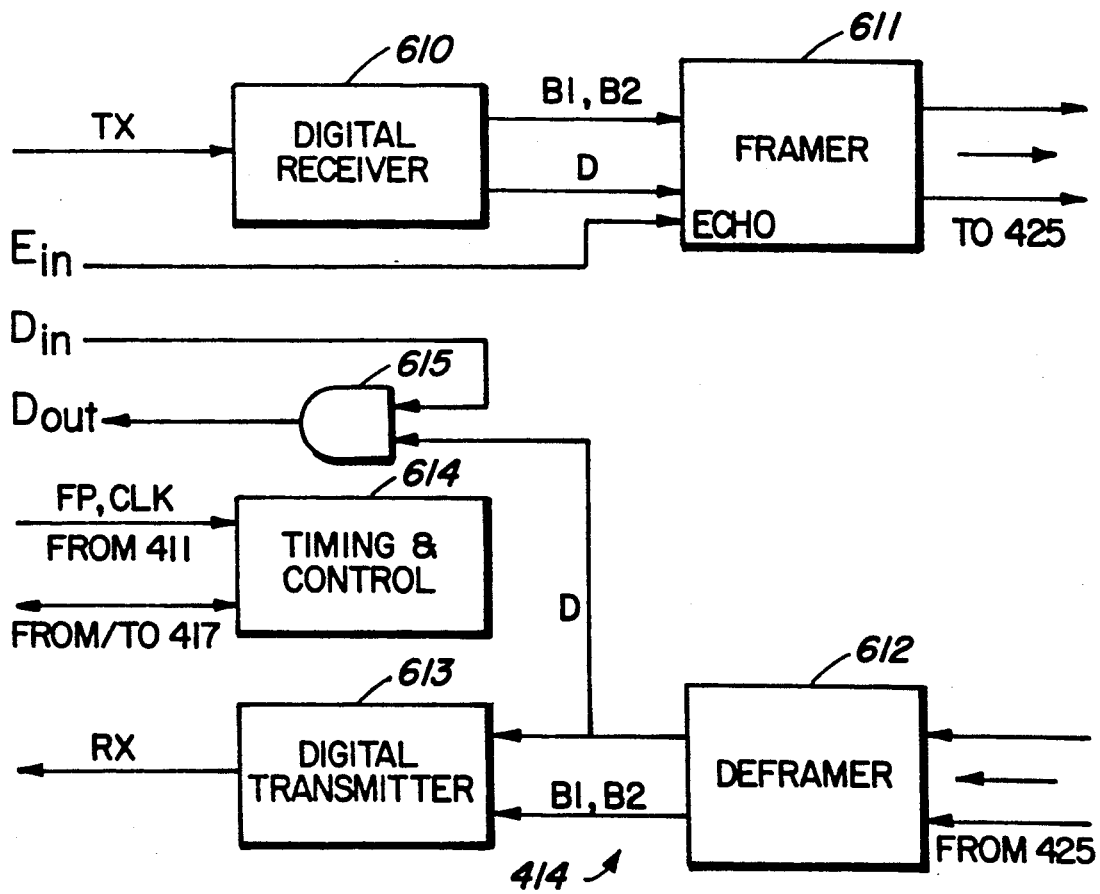
FIG. 6, illustrates operation of an S/T transceiver of the network terminator of FIG. 4.

The S/T transceiver 414 in the network terminator section of the integrated terminal apparatus and network terminator 410 of FIG. 4 is a Motorola MC145475 configured for use in a star configuration, even though the remote terminals 119 are connected in bus configuration. In a star configuration, a network terminator would have several S/T transceivers and corresponding interfaces, a common D-echo signal for all such interfaces being provided by supplying the $D_{out}$ from each S/T transceiver to the $D_{in}$ of its neighbour. As shown in FIG. 6, S/T transceiver 414 comprises a digital receiver 610, framer 611, deframer 612, and digital transmitter 613 controlled by microcontroller 417 (FIG. 4), the control function being represented in FIG. 6 by timing and control means 614. These components correspond to those in FIG. 2, namely digital receiver 210, framer 211, deframer 212, digital transmitter 213, and timing and control means 214. In addition, the S/T transceiver 414 includes a two-input AND gate 615 which is used to derive the D-echo signal from the common D-channel. One input of the AND gate 615 is connected to a separate terminal to receive $D_{in}$. {If the S/T transceiver 414 were used in a star configuration, $D_{in}$ would be supplied from the $D_{out}$ output of a preceding S/T transceiver in "daisy chain" fashion. An exception is the first stage, which would have its $D_{in}$ supplied from the +5 volt supply (or binary 1).} The other input of AND gate 615 is connected to the output of deframer 612 to receive the received D-channel signal. The output of AND gate 615 is supplied as signal $D_{out}$ to an output terminal of the S/T transceiver 414. {In the usual star configuration, it would be supplied to the $D_{in}$ of a succeeding S/T transceiver. The $D_{out}$ of the final stage of this "daisy chain" would be fed back, in common, to the $E_{in}$ terminals of all of the S/T transceivers where it would be applied to the ECHO input of framer 611, which would send it to all of the terminals as the D-echo signal}.

When the S/T transceiver 414 is used in the integrated terminal apparatus and network terminator 410, the AND gate 615 is used to facilitate the integration of a terminal apparatus without limiting the permissible loop configurations, as will become apparent from the ensuring description.

Referring again to FIG. 4, the local or integrated terminal apparatus comprises user interface and LAPD circuit 418, DMCR 427 and D-channel access module 423. The local terminal apparatus has no timing recovery circuit per se and its signal has no contribution to timing recovery in the S/T transceiver 414. Basically, when the handset "goes off hook" or the key pad is used, the microprocessor 421 will initiate D-channel signalling to obtain a B channel for the handset 419 to communicate with the network central office via U-transceiver 411. This is done in a conventional manner and once the B channel has been assigned, the user interface and LAPD can transmit its message onto the signal $TX_{LAPD}$ and hence to U-transceiver 411. If there were no remote terminals 119, the user interface and LAPD circuit 418 could communicate directly with the U-transceiver 411. The S/T interface 425 could then be omitted completely together with the D-channel access module 423, the DMCR 427, and the S/T transceiver 414.

In view of the presence of remote terminals, however, it is necessary for the local terminal to synchronise itself with the timing of the remote terminals and hence D-channel access module 423 and DMCR 427 are required. The D-channel access module 423 enables the local or integrated terminal apparatus to gain access to the integrated network terminator section in competition with the remote terminals (if any). The U-transceiver 411 supplies the framing signal FP and clock CLK directly to D-channel access module 423 by way of the control bus 415. D-channel access module 423 receives the remote D-channel signal from $D_{out}$ of S/T transceiver 414 and supplies a D-echo signal to its $E_{in}$ terminal. This D-echo signal contributes to the D-echo channel which is used for the rest of the system and other remote terminals. The D-channel access module 423 also serves to align the local D-channel signal to the remote D-channel signal from the S/T transceiver 414, and hence sending the resultant D-channel signal to the U-transceiver 411 for insertion into the signal to the central office. Since unlike the remote terminal apparatus, the local terminal apparatus is not subject to the loop delays or T framing alignment, the D-channel access module 423 must ensure that the local terminal's D-channel from $TX_{LAPD}$ is correctly retimed relative to the D-channel from the remote terminal apparatus received signal $TX_{S/T}$. Although the D-channel in the received signal $TX_{S/T}$ will be determined by the loop configuration, it will be at a fixed position relative to the frame marker in the transmit signal T and hence relative to the framing signal FP detected by the U-transceiver 412. The D-channel access module 423 uses the framing signal FP to determine the correct timing for insertion of the local terminal's D-channel in the signal $TX_{DCAM}$, and hence data bus RX passed to the U-transceiver 411. The D-channel access module 423 detects the framing signals FP and CLK. It then uses these signals to generate the signals $B_{sel}$ and $D_{sel}$ to control tristate gate 717 for gaining access to the data bus RX to U-transceiver 411. The delayed D-channel (local) is referred to as $TX_{DCAM}$. The combination of $TX_{DCAM}$ and $TX_{S/T}$ make up the data bus RX signal to U-transceiver 411.

It should be noted that in remote terminal 119 in FIG. 4 the user interface and LAPD circuit 418 drives the data bus RX directly to supply its signal (comprising B and D channels) to the S/T transceiver 121. In the case of the local terminal apparatus B and D channels from the user interface and LAPD circuit 418 are not correctly aligned for insertion into data bus RX and are taken into the D-channel access module 423. The D bits are stripped out, delayed, and re-inserted, while the B channel data is re-inserted as appropriate without delay. Thus, when the local terminal is seeking to gain access to the D-channel, the tristate gate 717 in the DCAM 423 becomes high impedance, coincident with the D-channel bit, so as to insert the signal $D_c$ (the delayed version of $D_b$) into the D-channel of signal $TX_{DCAM}$. On the other hand, when the local terminal has secured access, the DCAM 423 will drive the $TX_{DCAM}$ signal to zero coincident with the signal $D_c$, which is a binary zero, to be transmitted by the local terminal. When signal $D_c$ comprises binary ones coincident with the D-channel, the tristate gate 717 remains high impedance. An external "pull-up" resistor on data bus RX keeps $TX_{DCAM}$ at binary one, unless a remote terminal apparatus drives it to zero from $TX_{S/T}$.

Figure 7:
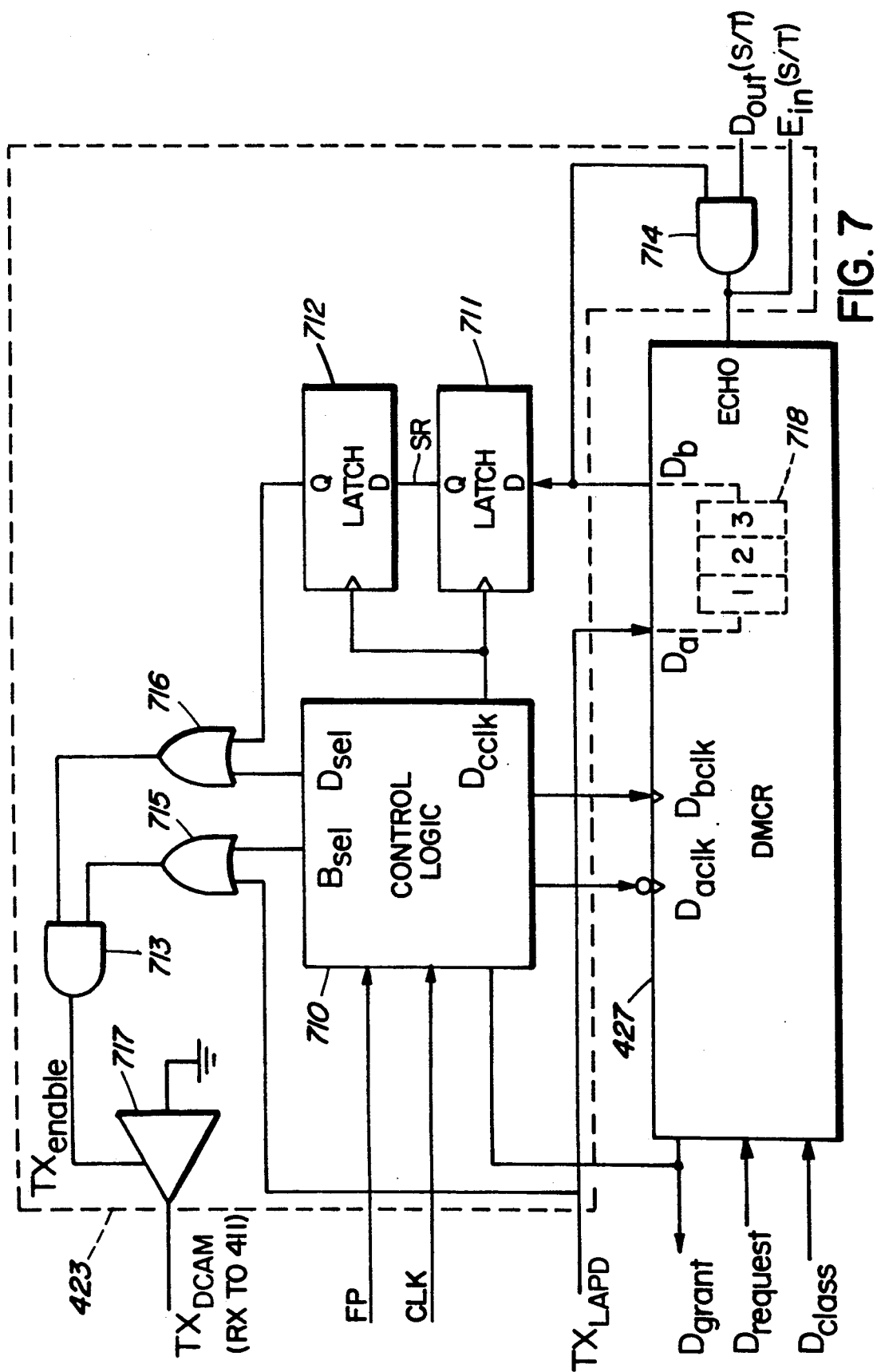
FIG. 7 is a block schematic diagram of a D-channel access module of the network terminating terminal apparatus of FIG. 4.

The D-channel access module 423 is shown in more detail, together with the DMCR 427, in FIG. 7. The signals it handles are illustrated in FIGS. 3A and 3B, which show the two different positions of $D_{GRANT}$ with respect to framing pulse FP.

Referring to FIG. 7, the D-channel access module 423 comprises control logic 710, two latches 711 and 712 which form a two-stage shift register, AND gates 713 and 714, two OR gates 715 and 716, and a tristate gate 717. The DMCR 427 includes a FIFO 718 shown in broken lines. Other components of the DMCR 427 are not shown. The FIFO 718 is shown to facilitate description of the operation of the DMCR 427. The two latches 711 and 712 are clocked by clock $D_{cclk}$. Latch 711 clocks the D-channel signal $D_b$ to provide an intermediate signal (referred to as SR) to the second latch 712. The output of latch 712 is signal $D_c$, which therefore is delayed two bit periods relative to $D_b$.

The output $D_c$ of latch 712 and control signal $D_{sel}$ from control logic 710 are applied to respective inputs of OR gate 716. The signal $TX_{LAPD}$ and control signal $B_{sel}$ from control logic 710 are applied to respective inputs of the other OR gate 715. The outputs of the OR gates 715 and 716 are combined by AND gate 713, the output of which, $TX_{enable}$, controls tristate gate 717. The output of tristate gate 717, $TX_{DCAM}$, is supplied to the U-transceiver 411 for combination with the signal $TX_{S/T}$ in WIRE-AND mode resulting in data bus RX signal.

When a user of the local terminal apparatus wishes to transmit, the user interface and LAPD circuit 418 (FIG. 4) will seek access to the D-channel by asserting $D_{request}$ to the DMCR 427. Taking account of various factors, such as the class of the request ($D_{class}$) and ECHO signal, as described in more detail later, the DMCR 427 will generate a signal $D_{grant}$ which will enable the transmission of the D-channel signal from the user interface and LAPD circuit 418 into the D-channel of the transmitted signal $TX_{LAPD}$, which subsequently will be inserted into the data bus signal RX translated onto the loop to the central office. In order to compute the correct timing instant to insert the D-channel form $TX_{LAPD}$ in the D-channel of $TX_{DCAM}$ and hence signal RX to the U-transceiver 411, the control logic 710 detects a pulse in the framing signal FP which it receives from U-transceiver 411 and counts the prescribed number of clock pulse time slots from the occurrence of the framing pulse FP to the D-channel.

Figure 8A:
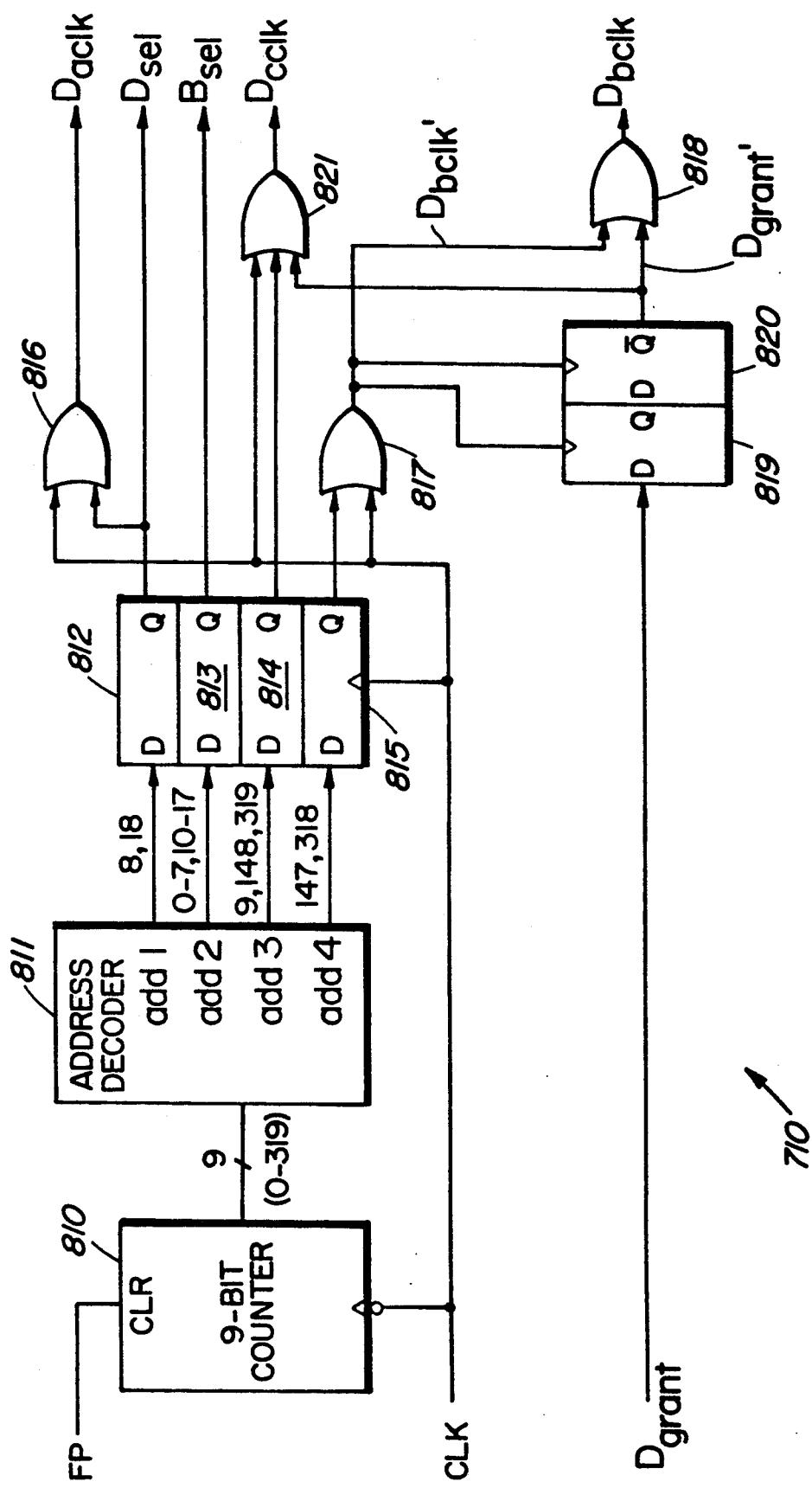
FIG. 8A is a block schematic diagram of control logic of the D-channel access module.

As shown in more detail in FIG. 8A, the control logic 710 comprises a 9 bit counter 810 which is reset by each framing pulse coincident with falling edge of CLK and counts subsequent clock pulses (CLK) from zero to a total of 319 before it is synchronously reset by the next framing pulse and CLK edge. Address decoder 811 produces outputs for different counts of the 9 bit counter 810 is Add1-8,18; Add2-0 to 7, 20 to 27; Add3-9, 148, 319; and Add4-147, 318. The address decoder 811 supplies four distinct outputs to respective inputs of a set of four latches 812 to 815, which are clocked, in common, on the rising edges of the clock signal CLK (See FIG. 8B).

The output of latch 812 is the control signal $D_{sel}$ which, as shown in FIG. 7, enables OR gate 716 to drive the output of tristate gate 717 through AND gate 713 in accordance with $D_c$. The control signal $D_{sel}$ is applied also to one input of an OR gate 816. Clock signal CLK is applied to the other input of OR gate 816 and its output is the clock signal $D_{aclk}$ which is used to latch the D-channel signal $TX_{LAPD} D_a$ into DMCR 427 on the falling edge. This signal is $D_a$ in FIG. 7.

The output of latch 813 is the control signal $B_{sel}$ which, as shown in FIG. 7, enables OR gate 715, by way of AND gate 713, to drive the output of tristate gate 717 to transmit B-channel data in the signal $TX_{DCAM}$ and hence data bus signal RX to U-transceiver 411.

The output of latch 815 and the clock signal CLK are applied to respective inputs of an OR gate 817, the output of which is applied to respective inputs of an OR gate 818 and as a clock $D_{bclk'}$ to a pair of cascaded latches 819 and 820, respectively. The latches 819 and 820 delay the signal $D_{grant}$, using the rising edge of $D_{bclk'}$ and apply the delayed signal $D_{grant'}$ to the other input of OR gate 818. The output of OR gate 818 is the clock signal $D_{bclk}$.

Figure 8B:
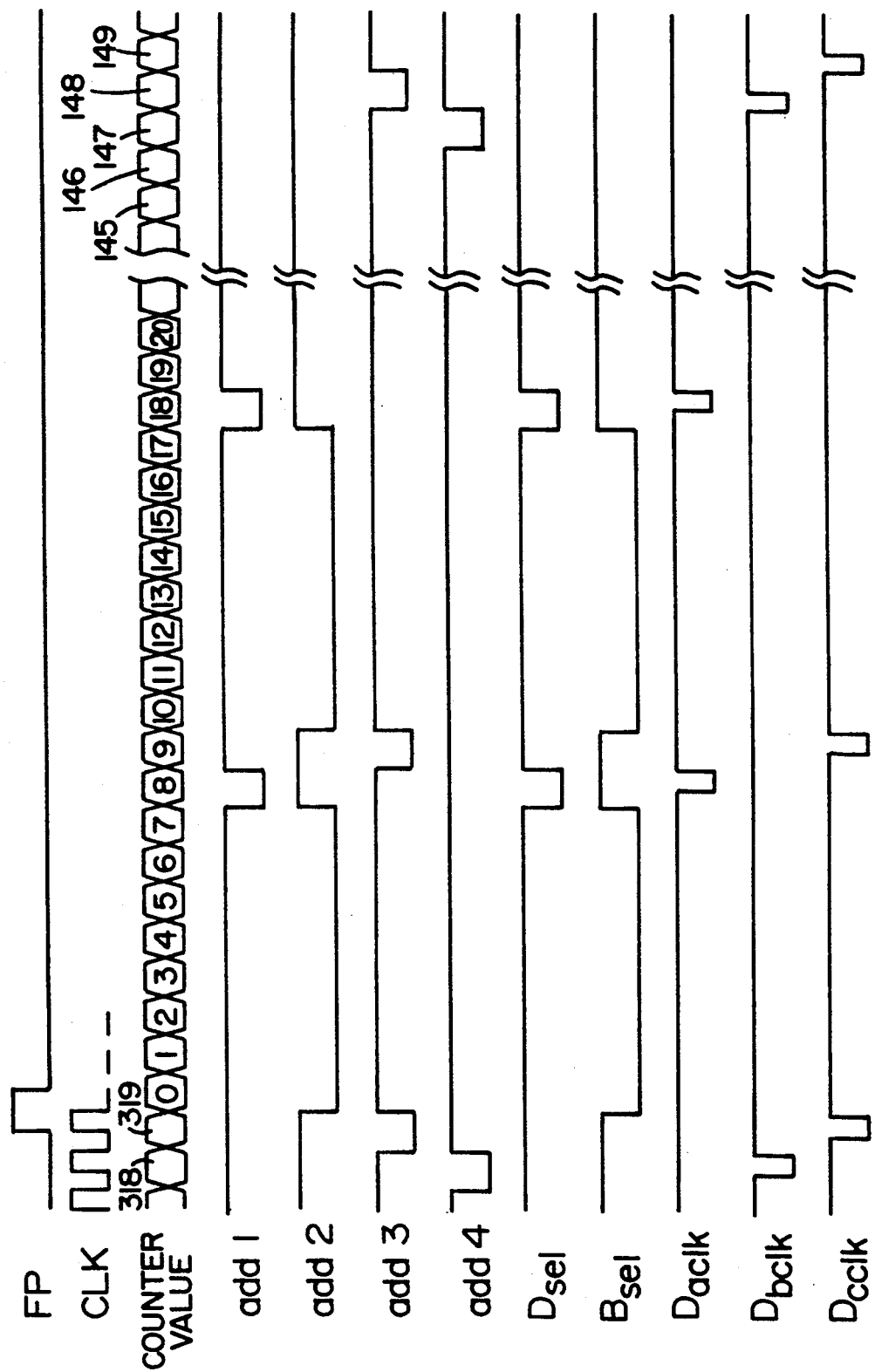
FIG. 8B is a timing diagram for the control logic of FIG. 8A.

The outputs of latches 814 and 820, respectively, and the clock signal CLK, are applied to respective inputs of an OR gate 821, the output of which is the clock signal $D_{cclk}$. The relationship between the various signals is shown in FIG. 8B.

Referring again to FIG. 7, the signal $TX_{LAPD}$ from user interface and LAPD circuit 418 comprises B-channels and D-channels. When $B_{sel}$ is asserted by control logic 710, the B-channel gate applies the B-channel signal (B1 and B2) to tristate gate 717 by means of AND gate 713 which passes it to the U-transceiver 411. The local terminal detects the remote D-channel condition immediately since it is connected to the network terminator whereas the remote terminals cannot detect any changes in the D-channel until they have received the returned D-echo signal. Hence, when $D_{sel}$ is asserted, the latches 711 and 712 delay the locally generated D-channel control signal ($D_b$) for two D-channel bit periods, i.e. two periods of the series of D-channel bits. The signal $D_c$ from latch 712 controls the D-channel of the signal $TX_{DCAM}$ and hence the data bus RX signal to U-transceiver 411 by way of the D-channel OR gate 716, the AND gate 713 and the tristate gate 717.

At this point the D-channel bit (the combination from remote and local terminal apparatus) has been inserted into the signal going to the central office but also must be returned to the remote terminals as an ECHO signal. This is achieved using AND gate 714. The D-channel bits $D_a$ from the user interface and LAPD circuit 418 occur in pairs. The DMCR 427 clocks them into its internal FIFO 718 which clocks them out in synchronism with the transmit frame marker F/L and before the next D-echo channel bit "E" of the transmit signal T. This adjusts the timing to take account of the relative positions of the framing pulse and the frame marker F/L which is transmitted to the remote terminals. The $D_b$ signal applied to latch 711 also is applied to AND gate 714 where it is combined with the signal $D_{out}$ from the remote terminals. This would be the ECHO signal in the case where there is no local terminal apparatus. In essence AND gate 714 combines the "local" ECHO resulting from signal $D_b$ with the remote ECHO resulting from $D_{out}$ and generates a new ECHO signal $E_{in}$ which the S/T transceiver 414 in the network terminator section of the NTTA 410 of FIG. 4 returns to the remote terminals as the ECHO signal (E bits) of the transmit signal T.

When the D-channel signal $D_b$ is sending IDLE, before securing access, there is no output from the OR gate 716. Hence the tristate gate 717 presents a high impedance to the $TX_{DCAM}$ signal during the D-channel time slots and hence does not affect the data bus RX signal. The data bus RX signal to the U-transceiver 411 is maintained "HIGH" by a supply rail through a "pullup" resistor. So long as tristate gate 717 is high impedance, it will not drive the data bus RX to "LOW" or "ZERO", though other components, for example, the S/T transceiver 414, can do so from signal $TX_{S/T}$. Once the local terminal secures access, the D-channel signal $D_c$ is asserted and a zero is produced by the AND gate 713 to drive tristate gate 717 to drive the $TX_{DCAM}$ signal, and hence the data bus RX to zero.

Referring to timing diagram FIG. 3A, in which the designations for the D-channel bits start with R for a D-channel bit from a remote terminal and L for a D-channel bit from the local terminal, the U-transceiver 411 derives the signal FP from the signal received from the central office. As shown in FIG. 3A, the framing pulses $FP_1$ and $FP_2$, actually occur at the beginning of the least significant bit of each of the B1 data segments in signal T. As it leaves the S/T interface 425, signal T will include, in certain circumstances, a D-echo channel bit E which is inserted by the S/T transceiver 414 via the $E_{in}$ input. For the S/T transceiver 414 to insert a bit in the D-echo channel of signal T, the $E_{in}$ signal indicating valid data must be valid concurrently with transmission of the associated E bit in signal T as shown in FIG. 3A. In practice, $E_{in}$ must be valid slightly earlier to allow for latching. It should be appreciated that the S/T transceiver 414 always inserts the $E_{in}$ signal into the D-echo channel. Whether or not this is a bit indicating valid data to be sent will depend upon the signal $E_{in}$ which is provided by gate 714 of FIG. 7. For the intervening periods i.e. between valid segments of $E_{in}$, the bit that is being placed in the E-channel is indeterminate and is of no importance since it is only transmitted during its time slot.

The signal $E_{in}$, and hence the state of the E bit in the D-echo channel of signal T, is determined by whether or not one of the terminals is attempting to access the D-channel. When one of the remote terminals attempts to gain access, it inserts a bit ($RD_1$) into the D-channel of the signal R which it returns to the S/T transceiver 414. The S/T transceiver 414 demultiplexes this D-channel bit and latches it to produce the signal $D_{out}$ which is applied to D-channel access module 423. This $D_{out}$ signal represents the combined D-channel of all of the remote terminals. As previously described, the D-channel access module 423, combines the signal $D_{out}$ with a signal $D_b$ which is produced by DMCR 427 and produces as a result the signal $E_{in}$ which, as previously mentioned, prompts the insertion of a valid E bit into the D-echo channel in signal T.

The DMCR 427 produces the D-channel bit $D_b$ in dependence upon a number of criteria including the request ($D_{request}$) by the local terminal, the class of the data to be transmitted ($D_{class}$) and the outcome of its own contention resolution between the local terminal and any remote terminal apparatus seeking access, i.e. between the $E_{in}$ from AND gate 717 and the $D_b$ from the DMCR 427.

Figure 9A:
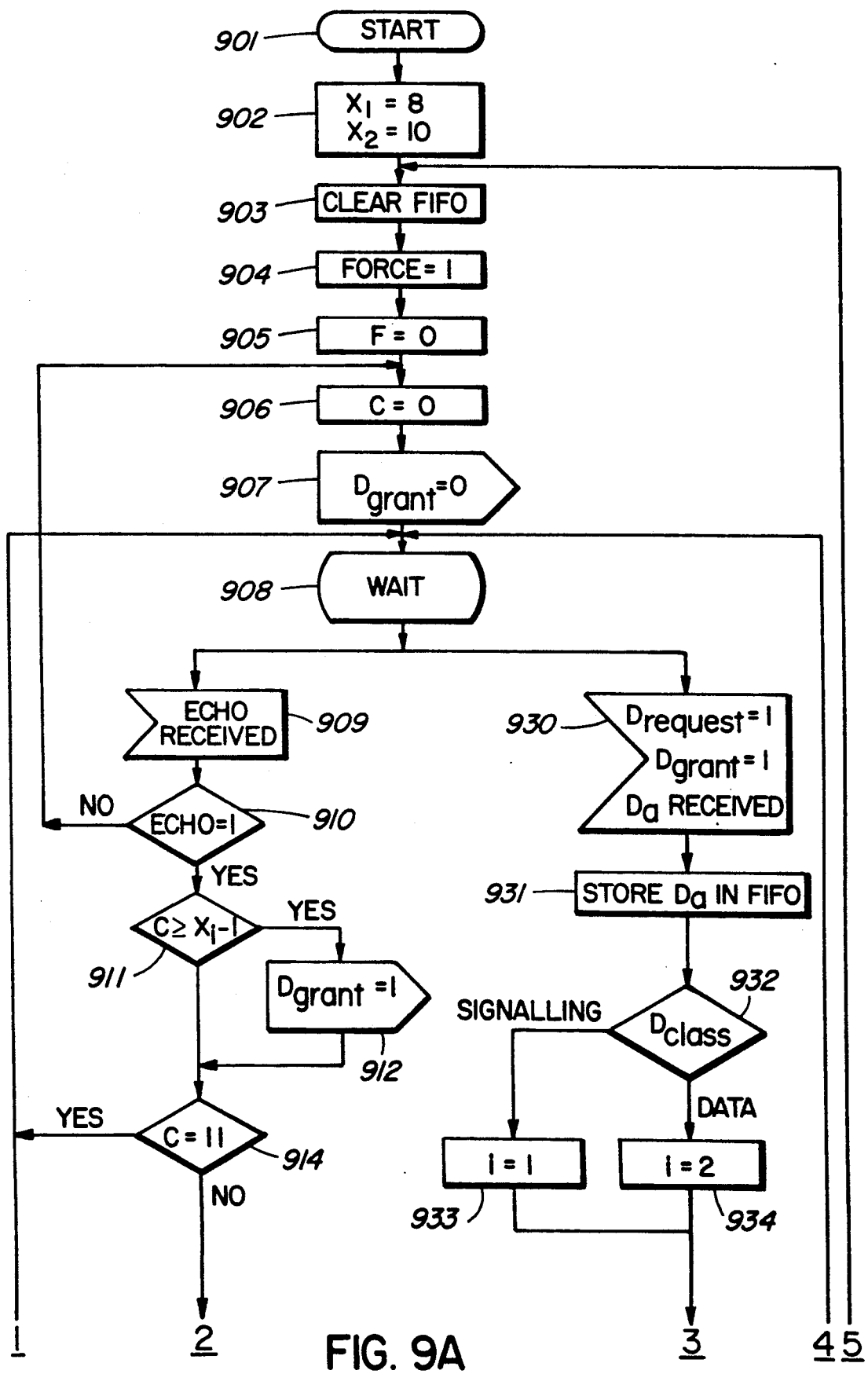
FIGS. 9A, 9B and 9C are a flowchart illustrating operation of a D-channel monitoring and contention resolution (DMCR) circuit of the integrated network terminator/terminal apparatus of FIG. 4.
Figure 9B:
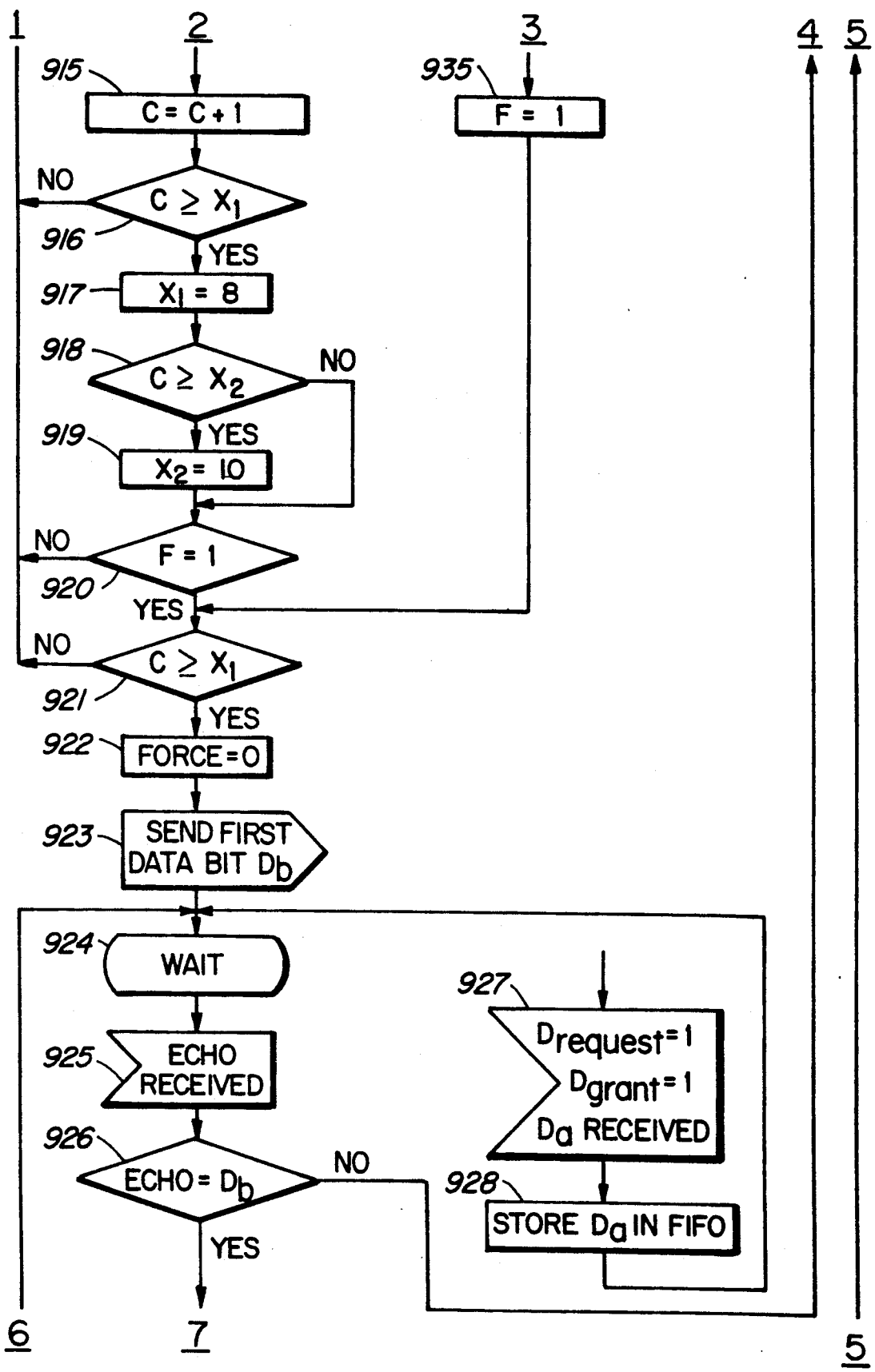
Figure 9C:
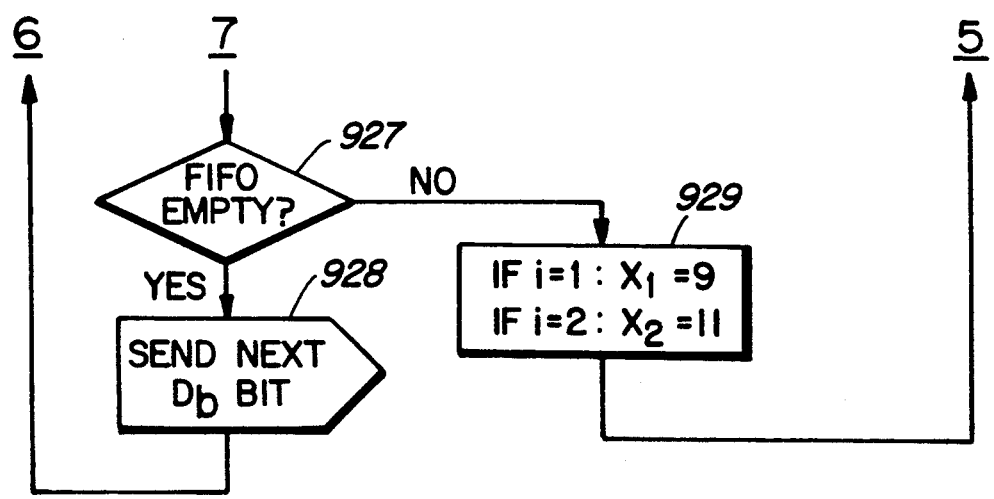

DMCR 427 performs its contention resolution functions as per the flowchart of FIGS. 9A, 9B and 9C to produce the signal $D_b$. Referring to FIG. 9A, when the system is first powered up, DMCR 427 enters the activated state shown by box 901 and sets a number of constants. Thus, step 902 sets the number of contiguous time slots (bits) for which the ECHO signal has to be monitored for IDLE. $X_1$ is the threshold level for priority class 1, signalling, and is set to count either 8 or 9 ECHO signal bits. $X_2$ is the threshold level for priority class 2, data, and is set to count either 10 or 11 ECHO signal bits. Immediately following successful transmission of an entire D-channel message, the threshold level for that class is set to the higher threshold level. The signalling priority class is set to 9 and the data priority class is set to 11. Also, as soon as the higher threshold level is achieved, it is reset to the lower threshold level. The difference between $X_1$ and $X_2$ ensures that priority is always given to signalling for access to the D channel and, furthermore the different threshold levels ensure access by unsuccessful terminal apparatus before successful terminal apparatus.

The D-channel bits that are to be transmitted are stored in FIFO 718 (FIG. 7). Step 903 clears the contents of this FIFO 718 and makes each cell in the FIFO 718 "empty". Step 904, "Force=1", ensures that the D-channel control signal $D_b$ is forced to binary one indicating that it is idle. The DMCR 427 continues to force D equal to one until it is ready to send a D-channel data signal. Step 904, F=0, sets a flag F to zero. When asserted, flag F indicates that the D-channel data is ready to be transmitted. Hence, setting flag F to zero indicates that, at this stage, there is no D-channel data ready to be sent. Step 906 sets variable C to zero, where C represents the count in the detectors which are counting the number of consecutive idle ECHO signal bits up to the maximum value of 11. Output step 907 sets the access enabling signal $D_{grant}$ to zero. With these steps completed the terminal enters its WAIT state 908.

With the DMCR 427 in its WAIT state 908, two events can occur. One is the reception of an ECHO signal bit ($D_{out}$ in NTTA 410) and the other is the reception of D-channel data which occurs when $D_{request}$ and $D_{grant}$ are both asserted and D-channel data signal $D_a$ is available. The ECHO received input 909 is the first step in a continuous cycle in which the D-channel monitoring and contention circuit 427 continuously monitors the D-channel by counting the number of contiguous E signal bits that are idle. According to step 910, after receiving an ECHO signal bit, its state is checked. Whenever this bit is zero, the DMCR 427 returns to step 906, resetting its count C to zero and starting afresh.

Conversely, when an ECHO signal bit is a one, decision step 911 determines whether or not the count C is greater than or equal to ($X_i-1$), where i is the priority class indicator, 1 or 2. If it is true, output step 912 asserts the access enabling signal $D_{grant}$ to one. Conversely, if the count C is less than $X_i-1$, then output step 911 proceeds to step 914.

As mentioned previously, the priority levels range from 8 to 11. D-channel data successfully sent causes $X_2$ to increase from 10 to 11, while D-channel signalling successfully sent causes $X_1$ to increase from 8 to 9. Decision step 914 determines whether or not the count C is already equal to the maximum value 11. If it is, the program returns the DMCR 427 to its WAIT state 908 where it waits for D-channel data or ECHO signal bits to be received. If C is not equal to 11, step 915 (FIG. 9B) increments the count C by 1. Decision step 916 then determines whether count C is greater than or equal to $X_1$ (for signalling). If it is not, the ECHO signal has not been monitored long enough, so access is denied and the program returns the DMCR 427 to the WAIT state 908. If count C is greater than or equal to $X_1$, step 917 resets threshold level of $X_1$ equal to 8.

Decision step 918 determines whether or not count C is greater than or equal to $X_2$ (NB $X_2$ is always greater than $X_1$). If it is, then D-channel data can be sent and step 919 resets the threshold level of $X_2$ equal to 10. If count C is less than $X_2$, however, step 919 is bypassed and decision step 920 checks the condition of flag F to see if it has been asserted indicating that a message is pending. It should be noted that, at this stage, permission to send D-channel signalling has been granted but, due to priority differences, permission to transmit D-channel data must still be given.

If flag F has not been asserted, the program returns DMCR 427 to its WAIT state 908. If flag F is equal to 1, i.e. the flag F has been asserted, decision step 921 checks whether or not the count C is greater than or equal to $X_i$ (i is 1 or 2), the value which enables transmission of D-channel bits. If it is not, the program returns the DMCR 427 to its WAIT state 908. If it is, indicating that the pending message's class criteria have been met, the contention resolution (collision detection) cycle commences with step 922 setting the FORCE flag to zero. Setting the FORCE flag to zero inhibits the forcing of $D_b$ to "one" or confirmed "idle" and enables the output of FIFO 718 to go to the D-channel control signal $D_b$. Output step 923 then outputs the first D-channel signal bit ($LD_1$) (see FIG. 3A) and the DMCR 427 then enters a second WAIT state 924 where it waits for either the corresponding ECHO signal bit ($E_1$) to appear at the ECHO received input of the DMCR 427 or D-channel data ($D_a$) with both $D_{grant}$ and $D_{request}$ asserted. For convenience, this condition will be referred to as "valid $D_a$". The D-channel data occurs in a two bit burst and DMCR 427 will store these two bits in empty cells in FIFO 718. If, however, input step 925 provides an ECHO received input, the comparison step 926 determines whether or not the received ECHO signal bit is the same as the previously transmitted D-channel signal bit $D_b$. If it is, decision step 927 (FIG. 9C) determines whether or not more D-channel bits remain in the FIFO 718 to be sent. If there are more, then output step 928 sends the next available D-channel bit $D_b$ to output as $LD_2$ and returns the DMCR 427 to WAIT state 924. If no more D-channel bits are stored in the FIFO 718, i.e. all cells in the FIFO 718 are empty and $D_{request}$ is not asserted, which indicates successful transmission of D-channel message is complete, function step 929 adjusts threshold levels accordingly and returns to step 903 (FIG. 9A) and the cycle starts afresh.

If comparison step 926 indicates that the ECHO signal bit is not the same as the previously-sent D-channel bit $D_b$, the program again returns the DMCR to its WAIT state 908.

Referring again to step 920, the setting of the flag F equal to 1 is done by a "pending message" loop commencing with step 930 (FIG. 9A).

The condition indicating a message is to be sent is that valid $D_a$, as defined above, has been detected by input step 930. In step 931 the DMCR 427 loads the FIFO 718 (FIG. 7) with the two D-channel bits ($D_a$). Decision step 932, in response to a signal from LAPD port 420 (FIG. 4) determines the priority class of the D-channel message to be sent, i.e. whether it is signalling or data. If it is signalling, function step 933 sets i equal to 1. If it is data, function step 934 sets i equal to 2. Thereafter, function step 935 (FIG. 9c) sets flag F equal to 1 to indicate a message is pending. The "pending message" loop then returns to step 921 for determination of the count C. The operations of DMCR 427 occur on the falling edge of $D_{aclk}$ and $D_{bclk}$ while $D_b$ is output on the rising edge of $D_{bclk}$.

The access enabling signal $D_{grant}$ may occur anywhere in a range of duration of two bit periods to eight bit periods of the signal R. Because there are two D-channel bits in the signal R between consecutive framing pulses FP, there are two ranges during which $D_{grant}$ may be asserted successfully. The ranges are shown as shaded areas in FIGS. 3A and 3B.

FIG. 3A shows how the D-channel access module 423 arranges the timing of the D-channel bits from the local terminal and the remote terminals for the situation where $D_{grant}$ occurs in a range at the furthest position after the framing pulse FP. FIG. 3B is a corresponding diagram for the situation where $D_{grant}$ occurs in a range at the nearest position after the framing pulse FP.

Referring to FIGS. 3A and 3B, it should be noted that signals $TX_{S/T}$, $TX_{LAPD}$, and $TX_{DCAM}$ are shown separately. $TX_{LAPD}$ is a real signal coming out of the user interface and LAPD circuit 418. $TX_{S/T}$ and $TX_{DCAM}$ do not occur as distinct signals but are shown here to illustrate how they combine to form the data bus signal RX which is received by the U-transceiver 411. As previously described with reference to FIG. 8A, the signal $D_{grant}$ is latched by clock signal $D_{bclk'}$, and subsequently delayed to produce signal $D_{grant'}$. $D_{grant'}$ is used to enable the clock signal $D_{bclk}$ which extracts D-channel data from the FIFO 718 in DMCR 427. This ensures that the local D-channel bit from the FIFO 718 corresponds in time to the remote D-channel data latched from signal R and output to signal $D_{out}$. The AND combination of these two signals produces the ECHO signal returned to the remote terminals on signal T, as previously explained. For example, ECHO signal $E_1$ is produced by local D-channel signal bit $LD_1$ AND remote D-channel signal bit $RD_1$.

Further, these D-channel data bits are shown with respect to the framing signal FP and the appropriate TX signal, i.e., local D-channel data from the DCAM 423 as signal $TX_{DCAM}$ and the signal $TX_{S/T}$. The data bus signal RX shows the combined result of the WIRE-AND of $TX_{DCAM}$ and $TX_{S/T}$. For example, $D_1$ shown on data bus RX is produced by the local $TX_{DCAM}$ D-channel bit $LD_1$ AND the remote $TX_{S/T}$ D-channel bit $RD_1$.

It should be noted that $D_i$ identifies an idle D-channel data bit, $D_1$ identifies the first D-channel data bit $D_2$ the second etc.

Figure 10A:
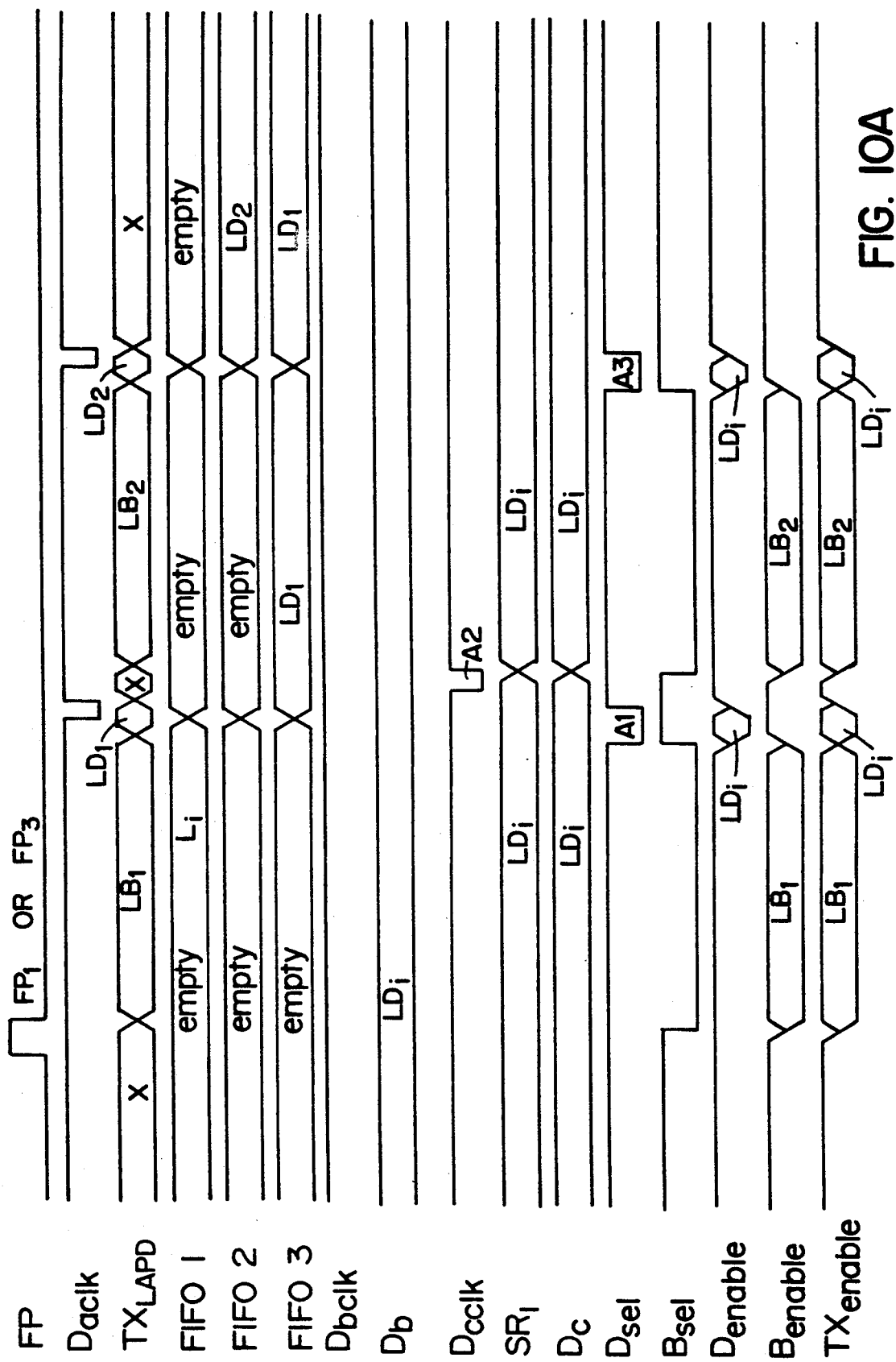
FIGS. 10A, 10B, 10C and 10D are timing diagrams for the signals in the network terminating terminal apparatus of FIG. 4.

FIG. 10A shows how the control logic and the DMCR 427 in FIG. 7 control the timing of signals $D_b$ and $TX_{DCAM}$ in order that the signals $TX_{S/T}$ and $TX_{DCAM}$ of FIG. 3A occur at the correct time for data bus RX. FIG. 10A actually refers to FIGS. 7 and 8A and the various signals that are generated there. The first trace in FIG. 10A is the framing signal FP and is shown relative to the data signal $TX_{LAPD}$ and the clock signal $D_{aclk}$. The D-channel bits in signal $TX_{LAPD}$ occur in pairs as $LD_1$ and $LD_2$ and are latched by the coincident clock (falling edge) of $D_{aclk}$ into the DMCR's FIFO 718. The input bits to FIFO 718 will ripple through it to the furthest empty stage, stage 3, as indicated in FIG. 10A. The initial state of the FIFO 718 is all empty. The first occurrence of D-channel data, bit $LD_1$ of $TX_{LAPD}$, at event A1 for the FIFO 718 in FIG. 10A shows two stages empty and the third stage with bit $LD_1$ in it. The next occurrence of D-channel data, $LD_2$, at event A3 shows that the $LD_2$ bit has rippled to the second stage of the FIFO leaving the first stage empty. It should be noted that FIG. 10A represents in effect about two of the bit periods of signal T of FIG. 3A to show what happens after the occurrence of framing pulse $FP_1$. Consequently, at this point there is no $D_{bclk}$ and $D_b$ is therefore IDLE ($LD_i$). The occurrence of a clock pulse, $D_{cclk}$ at the event A2 will therefore latch the idle bit of $D_b$ output SR, and latch the previous SR idle state to output $D_c$. Since $D_c$ is IDLE (binary 1) while the $D_{sel}$ is low in the D-channel time slot, $D_{enable}$, at the output of OR gate 716, will be IDLE and consequently $TX_{enable}$, at the output of AND gate 713, will be IDLE. Consequently tristate gate 717 will be high in a impedance state resulting in data output IDLE. The clock pulse A2 of clock signal $D_{cclk}$ occurs after the event A1 data is clocked through to $TX_{DCAM}$. This is because it is actually preparing the data that will occur at A2 for clocking out to the $TX_{DCAM}$ signal at event A3. Thus, referring again to FIG. 10A, the clock pulse A2 of $D_{cclk}$ really prepares the data for transmission when the next D-channel occurs at A3 which in this case corresponds to LD2 of signal $TX_{LAPD}$.

Figure 10B:
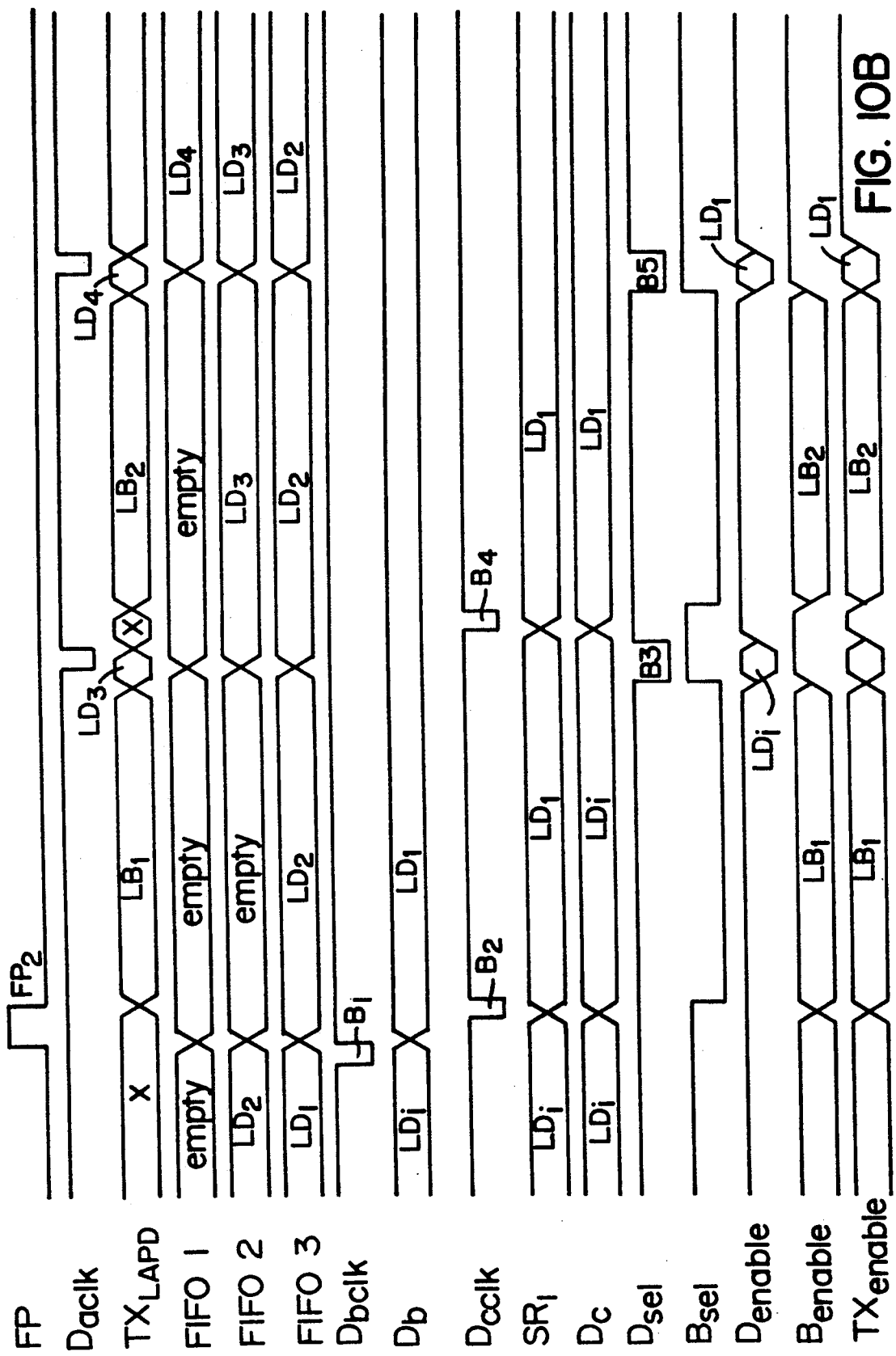

FIG. 10B is a corresponding sequence for the two D-channel bit periods following framing pulse FP2 of signal FP of FIG. 3A. In this case, the clock $D_{bclk}$ is shown with a clock pulse B1 occurring immediately before framing pulse FP2 of signal FP. Consequently, $D_b$ is switched from IDLE to data bit LD1. Clock $D_{bclk}$ clocks out the bit LD1 from FIFO 718. The other bit LD2 in FIFO 718 will ripple through to the third stage and render stages 1 and 2 empty as previously mentioned.

The clock signal $D_{bclk}$ now shows a pulse B21 which will clock latches 711 and 712 so that bit (LD1) at signal $D_b$ is provided first at intermediate signal SR and IDLE (LD1) at SR at the output of latch 712 as signal $D_c$. It will be noted that $D_c$ is IDLE until the second pulse of clock $D_{cclk}$ occurs, i.e. B4, when it latches SR value LD1 to its output as signal $D_c$. Since $D_c$ is IDLE when the Dsel goes low designated as B3 in FIG. 10B the $D_{enable}$ signal will be IDLE and so will $TX_{enable}$. When the next occurrence of $D_{sel}$ going low occurs i.e. designated as B5 in FIG. 10B, the data signal $D_c$ will now control bit LD1 which will be output by $D_{sel}$. Consequently, $D_{enable}$ shows a data value corresponding to LD1 and likewise $TX_{enable}$ will follow $D_{enable}$ which, according to the D-channel protocol, will be binary zero. Consequently the tristate gate 717 will switch from its high impedance condition to drive a zero in the signal $TX_{DCAM}$ and ultimately in the data bus signal RX returned to the U-transceiver.

FIGS. 10A and 10B also show how the data $TX_{LAPD}$ is transferred by way of $B_{sel}$, $B_{enable}$ and $TX_{enable}$ to drive the tristate gate output to the appropriate state, high impedance or zero, for transmission of the B channel data B1 and B2 into signal $TX_{DCAM}$ and hence data bus RX to U-transceiver 411.

Referring now to FIG. 3B, the events immediately following framing pulse FP3 will unfold in much the same way as those following framing pulse FP1 and are as shown in FIG. 10A.

Figure 10C:
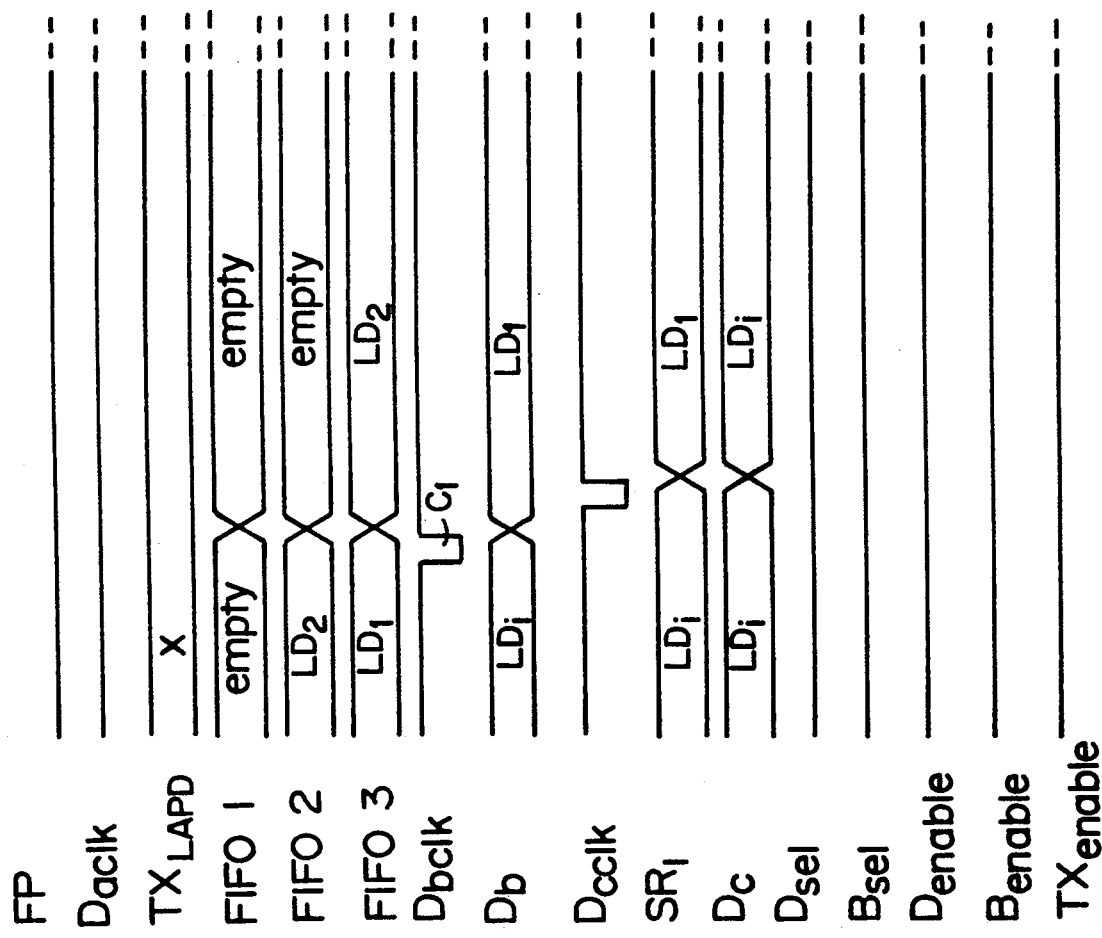

FIG. 10C depicts the events surrounding the next occurring pulse of clock $D_{bclk}$ shown in FIG. 3B as event 4, particularly the way that the FIFO is altered. As shown the FIFO stage 3 is first output to $D_b$ then to SR and FIFO stages 1 and 2 are emptied.

Figure 10D:
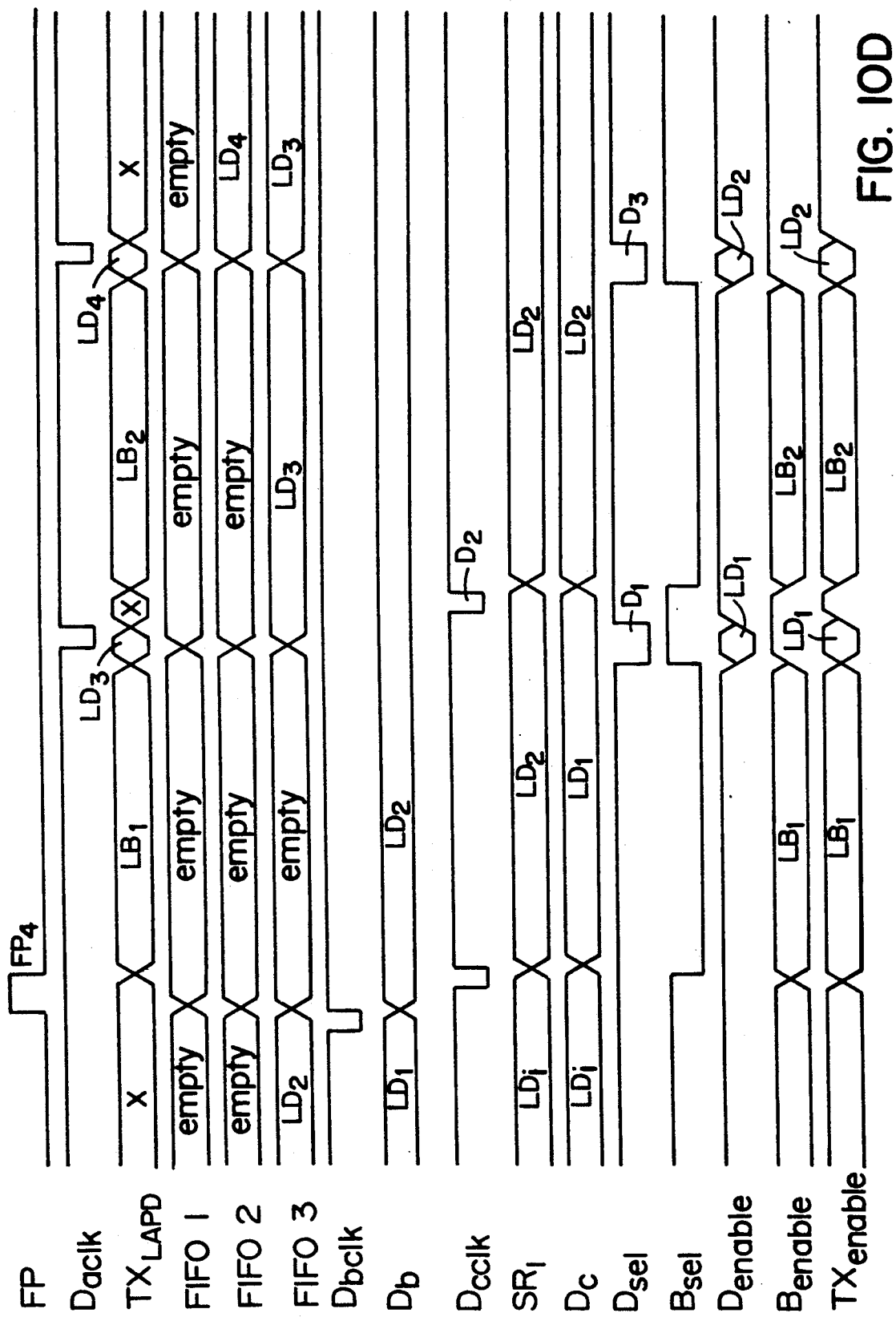

FIG. 10D then shows what happens when FP4 occurs. Basically the sequence of events is similar to that described with reference to FIG. 10B except that in this case bit LD1 is available earlier so signal $D_{enable}$ follows bit LD1 in the first D-channel period, designated as D1, as a result of which $TX_{enable}$ would drive the tristate gate 717 output to zero in the D-channel following D-channel protocol convention. Returning again to FIG. 10D, the next occurrence of the D-channel, designated as D3, will result in the bit LD2 bit being clocked out of the latch as signal DL and $D_{enable}$ will follow bit LD2 and $TX_{enable}$ will also follow bit LD2 which will switch the tristate gate 717 back to high impedance. In effect this transmits a one in the D-channel in accordance with the D-channel protocol. The other terminals will not pull the bus to zero again because of the protocol on the D-channel which they obey, i.e. they will also be transmitting binary ones (high impedance on $TX_{S/T}$. Consequently, the zero generated by bit LD1 bit of FIG. 10D in $TX_{enable}$ will ensure that the subsequent switching of tristate gate 717 to which high impedance condition will transmit a one. It should be noted at this stage that throughout the description LD1 and RD1 are binary zeros while all others (LD2, RD2 etc.) one binary one in accordance with the D-channel protocol.

It should be noted that although reference is made to the framing pulse in reality it is the clock pulses ($D_{aclk}$, $D_{bclk}$, $D_{cclk}$) which trigger these events and which are being described in more detail in FIGS. 10A, 10B, 10C and 10D.

Various modifications are possible without departing from the scope of the invention as defined by the appended claims. For example, the AND gate 714 (FIG. 7) could be omitted and AND gate 615 (FIG. 6) could also perform its function. Then signal $D_b$ would be supplied to $D_{in}$ of the S/T transceiver 414, $D_{out}$ and $E_{in}$ of the S/T transceiver 414 would be connected to each other and to the ECHO input of DMCR 427.

It will be appreciated that, although the specific example has the D-channel range from two bit periods to eight bit periods, the range may vary according to the loop configuration.

An advantage of embodiments of the invention is that the whole complement of remote terminals can be connected to the S/T interface.

Figure 11:
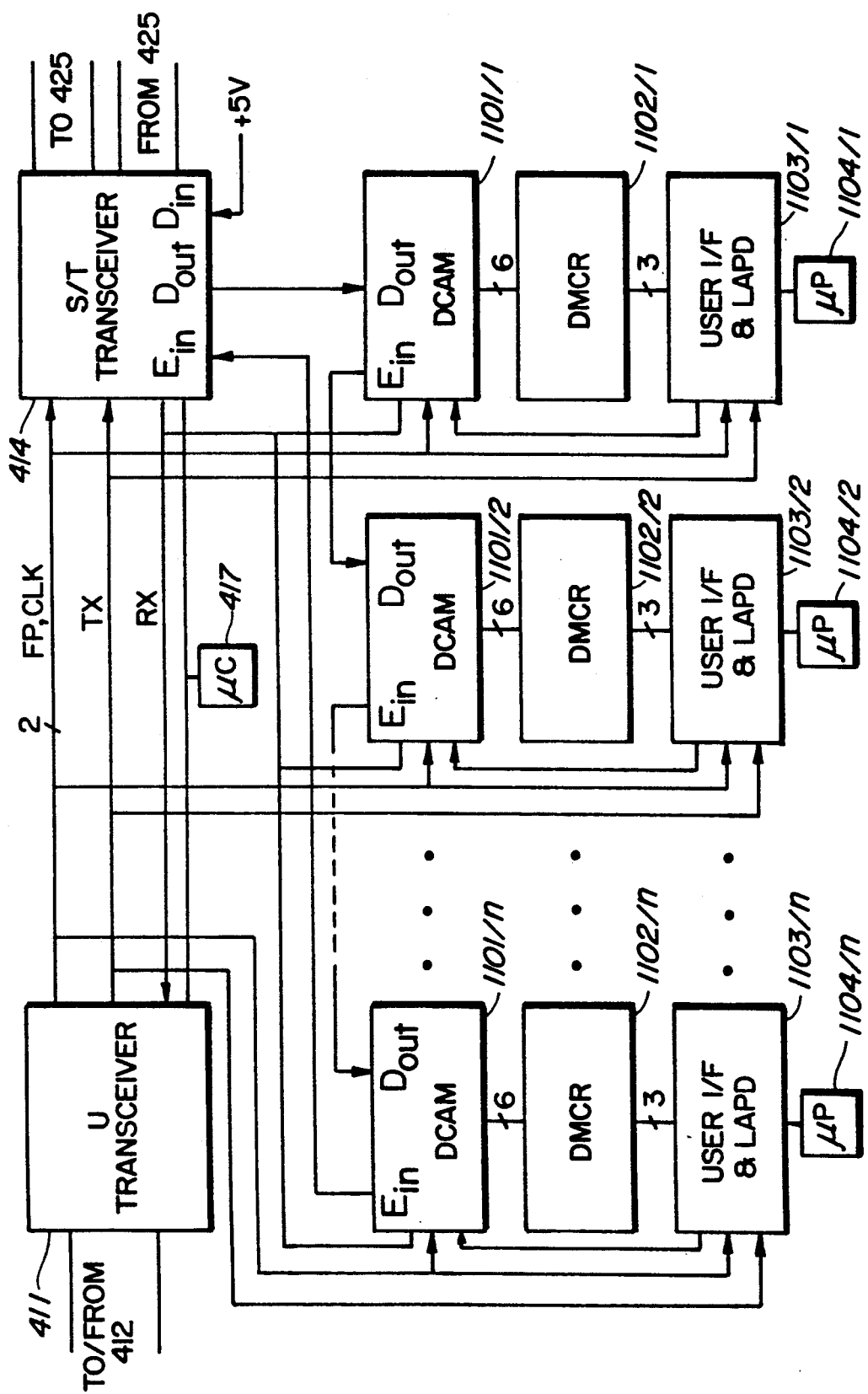
FIG. 11 illustrates a modified network terminating terminal apparatus comprising several integrated terminal apparatus.

An advantage of such an integrated network terminating terminal apparatus is that it allows the subscriber to add any number of other local terminal apparatus, not limited to eight as specified in ANSI T1.605 using a D-channel access module as disclosed herein. Such a modification is shown in FIG. 11, which shows how several local terminal apparatus could be interfaced together. Each local terminal apparatus comprises a DCAM 1101, DMCR 1102, a user interface and LAPD circuit 1103 and microprocessor 1104 corresponding to the components 423, 427, 418 and 421 of FIG. 4. The $D_{out}$ from the S/T transceiver 414 is connected to the first DCAM 1101/1, and the $E_{in}$ from the first DCAM 1102/1 is connected the $D_{out}$ input of the second DCAM 1101/2. The series continues in "daisy chain" fashion until, finally, the $E_{in}$ output of the last DCAM 1101/n is connected back to the $E_{in}$ input of S/T transceiver 414. In this way the local terminals all contribute to the ECHO signal and can all access the D-channel in contention with the remote terminals and indeed with each other.

Further, each local terminal apparatus contributes to the D-channel to the central office in the same way as the single local terminating apparatus, namely, the B channel and D-channel from each local terminal apparatus is combined in WIRE-AND format with the remote terminal apparatus to generate the data bus signal RX to the U-transceiver.

A further enhancement of this multiple local terminating apparatus feature would be to combine all microprocessor 1104 elements into a single shared microprocessor for all such local terminal apparatus. Also, the microcontroller (417) could be included in the shared microprocessor 1104.

Such integrated network terminating terminal apparatus (NTTA) allows point-to-point connections to be made without a separate network terminator. An advantage of this arrangement is that some of the interface hardware may be omitted, such as S/T interface transformers, microprocessor, and S/T interface circuitry. The microprocessor and microcontroller could be integrated.

Also, since the network terminating terminal apparatus controls the ECHO channel to remote terminals, it could be configured as a priority set or flow control set, i.e., it could force all remote terminal off-line by sending the opposite ECHO bit to that which it receives in $D_{out}$, and then transmit its own D-channel to the central office without the D-channel access algorithm to lock out other remote terminals.

I claim:

1. Network terminating terminal apparatus, for an Integrated Services Digital Network, comprising:
   a U-interface (412) for connection to the network;
   a U-transceiver (411) for transmitting signals to, and receiving signals from, the network via said U-interface serving to extract from signals received via said U-interface (412) B-channel data and D-channel data, a clock signal and framing signal;
   an S/T interface for connecting to remote terminal apparatus and a S/T transceiver (414) for transmitting signals to, and receiving signals from, said remote terminal apparatus via said S/T interface (425);
   a user interface and LAPD circuit (418) for interfacing local station apparatus (419, 422), including D-channel protocol means responsive to said user interface for generating a D-channel access signal ($D_{request}$, $D_{class}$) for securing access to said D-channel to enable said user interface and LAPD to transmit data to said U-transceiver (411);
   D-channel monitoring and contention resolution means (427) for monitoring a D-channel in a data signal from said protocol means and signals received from said remote terminals by said S/T transceiver (414) and resolving contention between said user interface and LAPD (418) and said remote terminal apparatus and for providing to said user interface and LAPD 418 a signal ($D_{grant}$) enabling access $D_{grant}$ and a D-channel control signal ($D_b$);
   D-channel access means responsive to said framing signal, said clock signal, said access enabling signal ($D_{grant}$) and said D-channel control signal ($D_b$) for controlling application to said U-transceiver 411 of B-channel data and D-channel data in said data signal from said user interface ($TX_{LAPD}$) and LAPD circuit (418) selectively;
   said D-channel access means (423) serving to supply a D-channel control bit ($E_{in}$) to said S/T transceiver, said S/T transceiver being arranged to transmit said bit as an ECHO signal to said remote terminals.

2. Apparatus as claimed in claim 1, wherein said D-channel monitoring and contention resolution means (427) comprises means (718) for extracting each D-channel bit ($D_b$) from the signal ($TX_{LAPD}$) received from said user interface and LAPD circuit and said D-channel access means (423) comprises means (714) for logically combining said D-channel bit ($D_b$) with corresponding bits from said remote terminals and supplying the resultant bit to said S/T transceiver (414) for return in the echo channel to said remote terminals; said D-channel access means (423) further comprising control means (710) responsive to said framing signal and said clock signal for generating control signals ($B_{sel}$ and $D_{sel}$), and gating means (713, 715, 716, 717) responsive to said control signals for enabling transmission to said U-transceiver (411) of either of said B-channel data and said D-channel signal ($D_b$) from said user interface and LAPD circuit (418).

3. Apparatus as claimed in claim 2, wherein said control means (710) is further responsive to the access enabling signal ($D_{grant}$) to provide a further clock signal and said D-channel access means further comprises delay means (711, 712) responsive to said further clock signal ($D_{cclk}$) for delaying said D-channel signal ($D_b$) relative to said B-channel data before application to said U-transceiver (411).

4. Apparatus as claimed in claim 3, wherein said delay means (711, 712) serves to delay said D-channel signal bit ($D_b$) by two D-channel bit periods ($D_{cclk}$).

5. Apparatus as claimed in claim 2, wherein said control means comprises a counter (810) for counting bits of said clock signal (CLK) and a decoder (811) responsive to the output of said counter (810) to provide outputs for selected counts, and logic means (816, 817, 818, 819, 820, 821) for generating from said selected counts and said access enabling signal a plurality of clock signals ($D_{aclk}$, $D_{bclk}$, $D_{cclk}$), said D-channel monitoring and contention resolution means (427) being responsive to predetermined ones of said plurality of clock signals.

6. Apparatus as claimed in claim 5, wherein said D-channel access means further comprises delay means (711, 712) for delaying said D-channel signal ($D_b$) relative to said B-channel data before application to said U-transceiver 411, said delay means (711, 712) being responsive to a predetermined one of said plurality of clock signals.

7. Network terminating terminal apparatus, for an Integrated Services Digital Network, comprising:
   a U-interface (412) for connection to the network;
   a U-transceiver (411) for transmitting signals to, and receiving signals from, the network, said U-transceiver (411) serving to extract from signals received via said U-interface (412) B-channel data and D-channel data, a clock signal and framing signal, and TX to C/O;
   an S/T interface for connecting to remote terminal apparatus and a S/T transceiver (414) for transmitting signals to, and receiving signals from, said remote terminal apparatus via said S/T interface (425);
   a plurality of local terminal apparatus each comprising a user interface and LAPD circuit (418) for interfacing local station apparatus (419, 422), including D-channel protocol means responsive to said user interface for generating a D-channel access signal ($D_{request}$, $D_{class}$) for securing access to said D-channel to enable said user interface and LAPD to transmit data to said U-transceiver (411);
   D-channel monitoring and contention resolution means (427) for monitoring a D-channel in a data signal from said protocol means and signals received from said remote terminals by said S/T transceiver (414) and resolving contention between said user interface and LAPD (418) and said remote terminal apparatus and for providing to said user interface and LAPD 418 a signal enabling access ($D_{grant}$) and a D-channel control signal ($D_b$); and
   D-channel access means responsive to said framing signal, said clock signal, said access enabling signal ($D_{grant}$) and said D-channel control signal ($D_b$) for controlling application to said U-transceiver 411 of B-channel data and D-channel data ($TX_{LAPD}$) in said data signal from said user interface and LAPD circuit (418) selectively;

said D-channel access means (423) serving to supply a B-channel control bit to said S/T transceiver, said S/T transceiver being arranged to transmit said bit as an ECHO signal to said remote terminals; wherein the respective D-channel inputs ($D_{out}$) and outputs ($E_{in}$) of the D-channel access means of said plurality of local terminal apparatus are connected in tandem between the D-channel input port ($E_{in}$) and D-channel output port ($D_{out}$) of said S/T transceiver.

8. Apparatus as claimed in claim 7, wherein each said D-channel monitoring and contention resolution means (427) comprises means (718) for extracting each D-channel bit ($D_b$) from the signal received from said user interface and LAPD circuit (418) and said corresponding D-channel access means (423) comprises means (714) for logically combining said D-channel bit ($D_b$) with corresponding bits from said remote terminals and supplying the resultant bit to said S/T transceiver (414) for return in the D-echo channel to said remote terminals; said D-channel access means (423) further comprising control means (710) responsive to said framing signal and said clock signal for generating control signals ($B_{sel}$ and $D_{sel}$), and gating means (713, 715, 716, 717) responsive to said control signals for enabling transmission to said U-transceiver (411) of either of said B-channel data and said D-channel signal ($D_b$) from said user interface and LAPD circuit (418).

9. Apparatus as claimed in claim 8, wherein said control means (710) is further responsive to the access enabling signal ($D_{grant}$) to provide a further clock signal and said D-channel access means further comprises delay means (711, 712) responsive to said further clock signal ($D_{cclk}$) for delaying said D-channel signal ($D_b$) relative to said B-channel data before application to said U-transceiver (411).

10. Apparatus as claimed in claim 9, wherein said delay means (711, 712) serves to delay said D-channel signal ($D_b$) by two D-channel bit periods of $D_{cclk}$.

11. Apparatus as claimed in claim 8, wherein said control means comprises a counter (810) for counting bits of said clock signal (CLK) and a decoder (811) responsive to the output of said counter (810) to provide outputs for selected counts, and logic means (816, 817, 818, 819, 820, 821) for generating from said selected counts and said access enabling signal a plurality of clock signals ($D_{aclk}$, $D_{bclk}$, $D_{cclk}$), said D-channel monitoring and contention resolution means (427) being responsive to predetermined ones of said plurality of clock signals.

12. Apparatus as claimed in claim 11, wherein said D-channel access means further comprises delay means (711, 712) for delaying said D-channel signal ($D_b$) relative to said B-channel data before application to said U-transceiver 411, said delay means (711, 712) being responsive to a predetermined one of said plurality of clock signals.

* * * * *